United States Patent [19]

Kamo

[11] Patent Number: 5,471,271
[45] Date of Patent: Nov. 28, 1995

[54] REAL IMAGE MODE VARIABLE MAGNIFICATION FINDER OPTICAL SYSTEM

[75] Inventor: Yuji Kamo, Hino, Japan

[73] Assignee: Olympus Optical Co., Ltd., Tokyo, Japan

[21] Appl. No.: 111,911

[22] Filed: Aug. 26, 1993

[30] Foreign Application Priority Data

Aug. 27, 1992 [JP] Japan ..................... 4-228953

[51] Int. Cl.$^6$ .................................. G03B 13/10
[52] U.S. Cl. ........................................ 354/222
[58] Field of Search .................... 354/222, 195.12

[56] References Cited

U.S. PATENT DOCUMENTS 4,751,539  6/1988  Yamada et al. .................... 354/222

FOREIGN PATENT DOCUMENTS 1284836  11/1989  Japan.
463313   2/1992   Japan.

*Primary Examiner*—David M. Gray
*Attorney, Agent, or Firm*—Cushman, Darby & Cushman

[57] ABSTRACT

A real image mode variable magnification finder optical system includes an objective system having a positive refracting power and an eyepiece system having a positive refracting power. The objective system includes a first lens unit (a front optical unit) having at least one lens, an intermediate lens unit having at least one lens unit moving along the optical path, and a rear optical unit having a plurality of reflecting surfaces. By replacing the first lens unit with a lens unit of different focal length, the magnification of the finder optical system is changed.

11 Claims, 23 Drawing Sheets

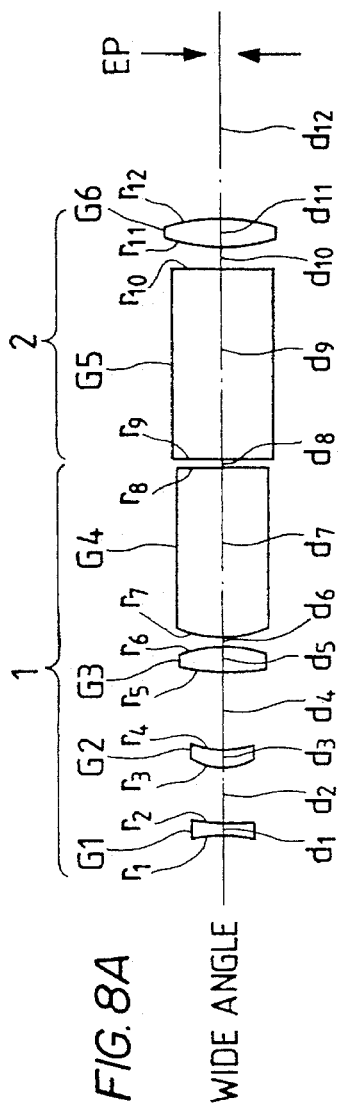
FIG. 8A WIDE ANGLE
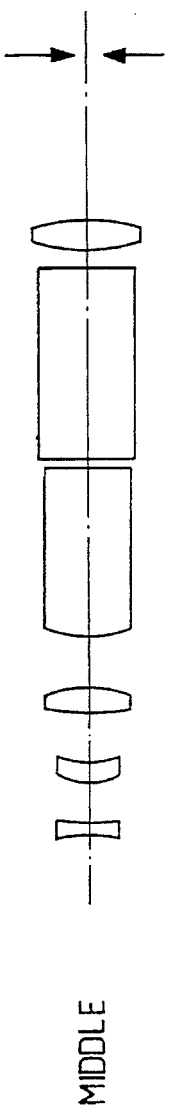
FIG. 8B MIDDLE
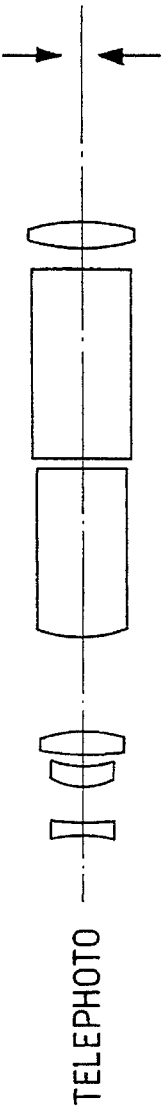
FIG. 8C TELEPHOTO

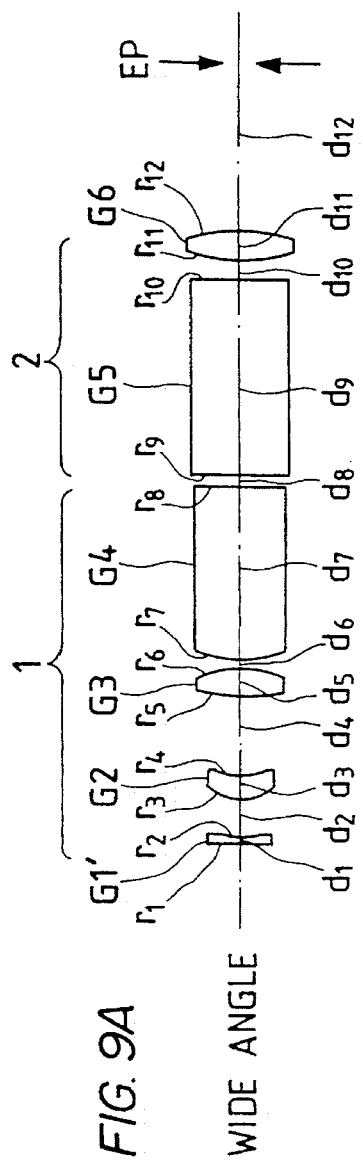
FIG. 9A WIDE ANGLE
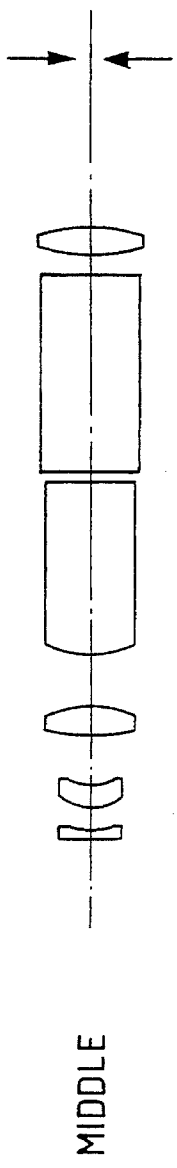
FIG. 9B MIDDLE
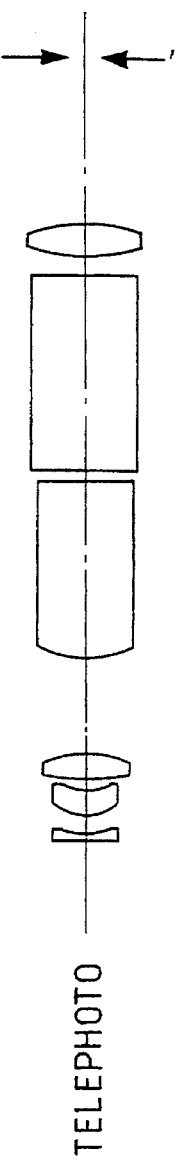
FIG. 9C TELEPHOTO SPHERICAL ABERRATION
PUPIL DIA.=2.0mm

ASTIGMATISM
ω=25.60°

DISTORTION
ω=25.60°

SPHERICAL ABERRATION
PUPIL DIA.=2.0mm

ASTIGMATISM
ω=19.65°

DISTORTION
ω=19.65°

SPHERICAL ABERRATION
PUPIL DIA.=2.0mm

ASTIGMATISM
ω=14.96°

DISTORTION
ω=14.96°

SPHERICAL
ABERRATION
PUPIL DIA.=2.0mm

ASTIGMATISM
ω=22.10°

DISTORTION
ω=22.10°

SPHERICAL
ABERRATION
PUPIL DIA.=2.0mm

ASTIGMATISM
ω=17.13°

DISTORTION
ω=17.13°

SPHERICAL
ABERRATION
PUPIL DIA.=2.0mm

ASTIGMATISM
ω=13.07°

DISTORTION
ω=13.07°

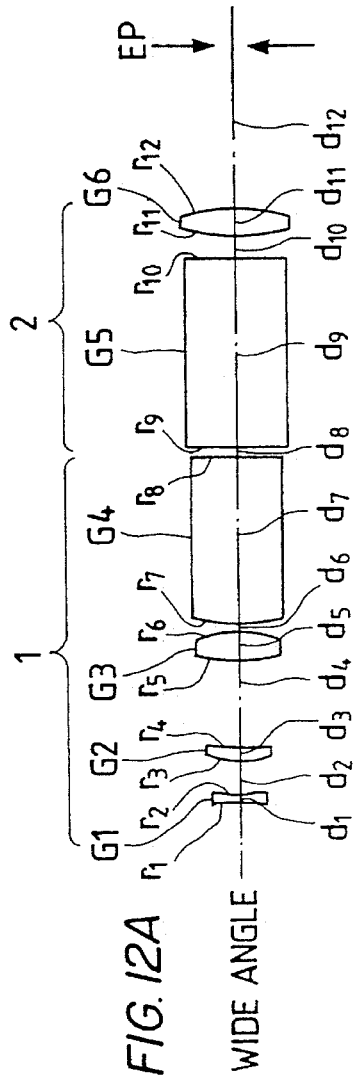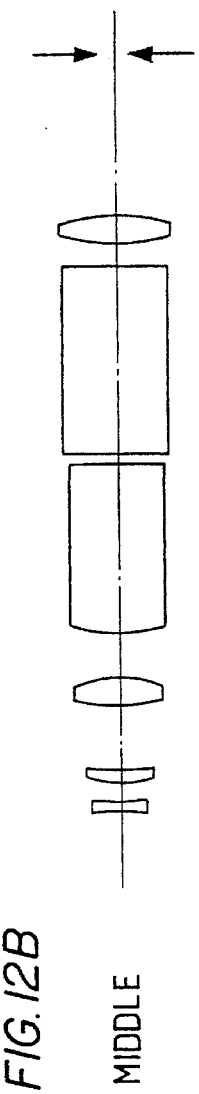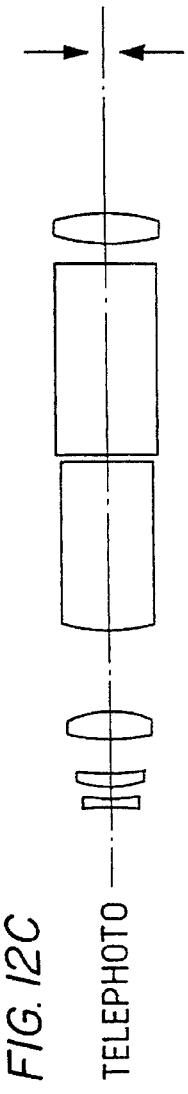
FIG.12A WIDE ANGLE
FIG.12B MIDDLE
FIG.12C TELEPHOTO

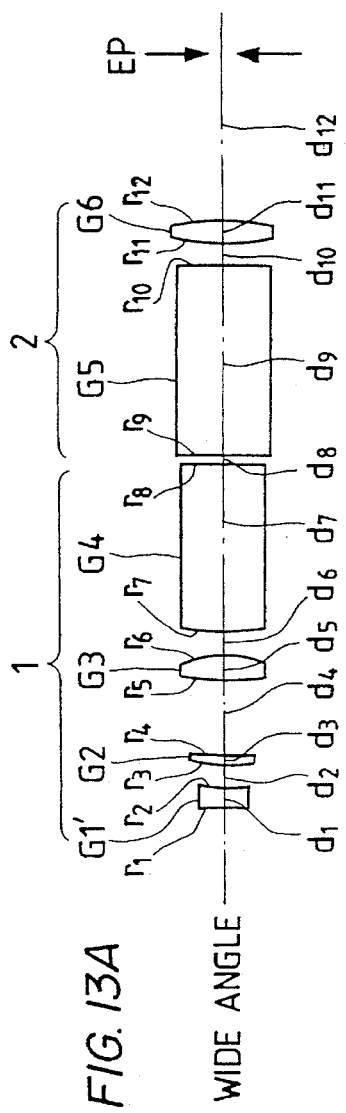
FIG. 13A WIDE ANGLE
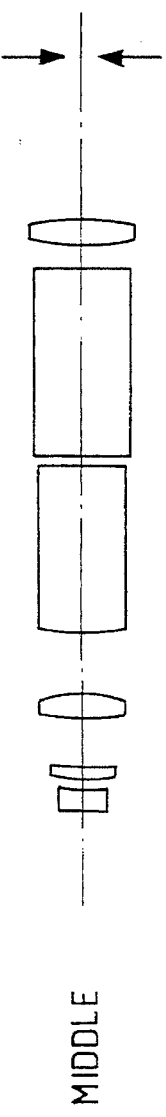
FIG. 13B MIDDLE
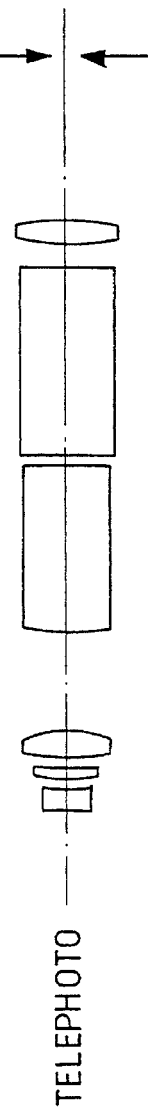
FIG. 13C TELEPHOTO

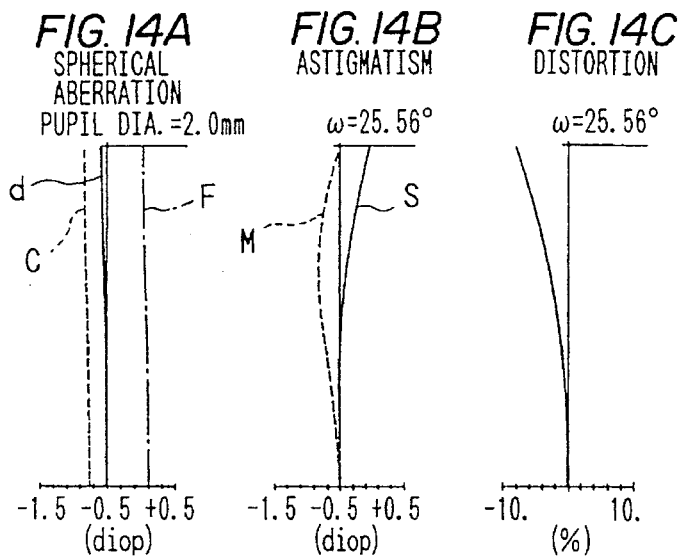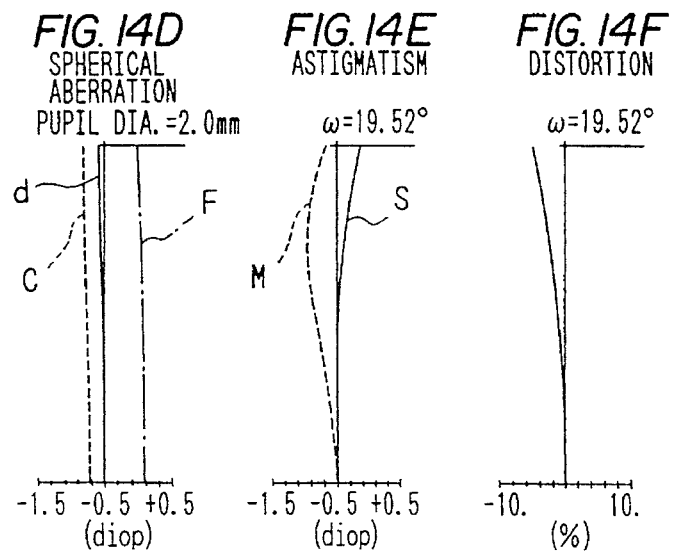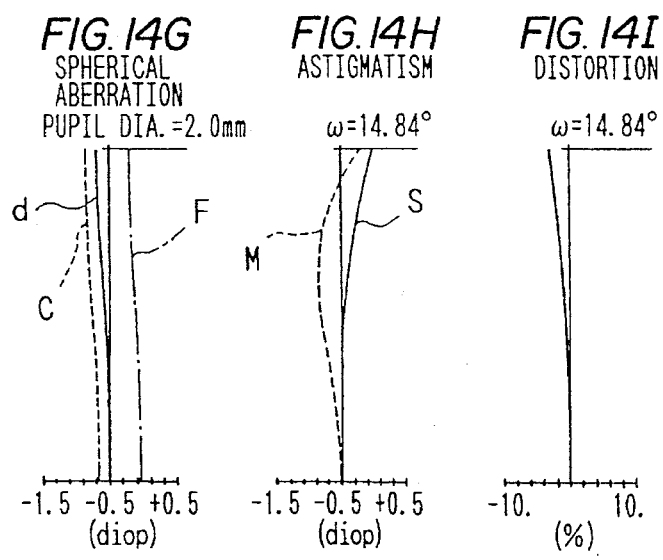

SPHERICAL ABERRATION
PUPIL DIA.=2.0mm

ASTIGMATISM
ω=23.18°

DISTORTION
ω=23.18°

SPHERICAL ABERRATION
PUPIL DIA.=2.0mm

ASTIGMATISM
ω=17.49°

DISTORTION
ω=17.49°

SPHERICAL ABERRATION
PUPIL DIA.=2.0mm

ASTIGMATISM
ω=13.18°

DISTORTION
ω=13.18°

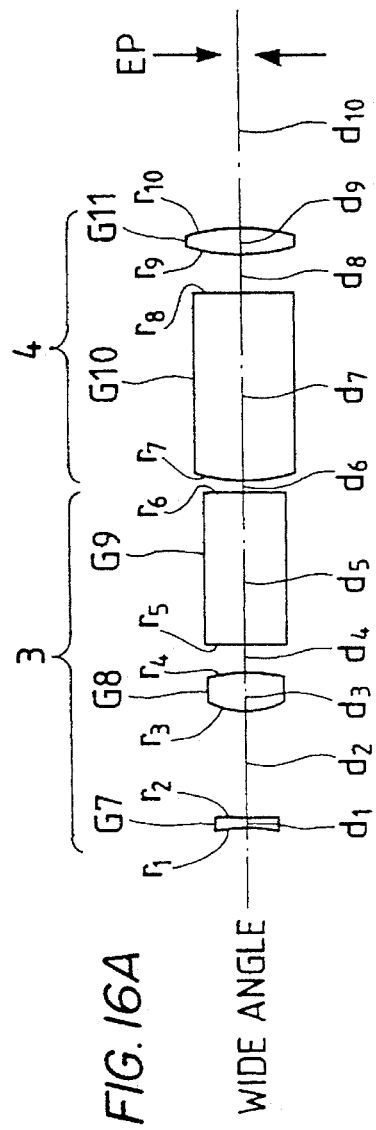
FIG. 16A WIDE ANGLE
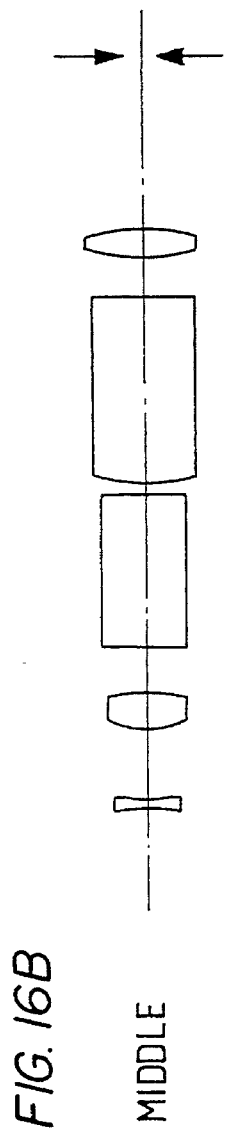
FIG. 16B MIDDLE
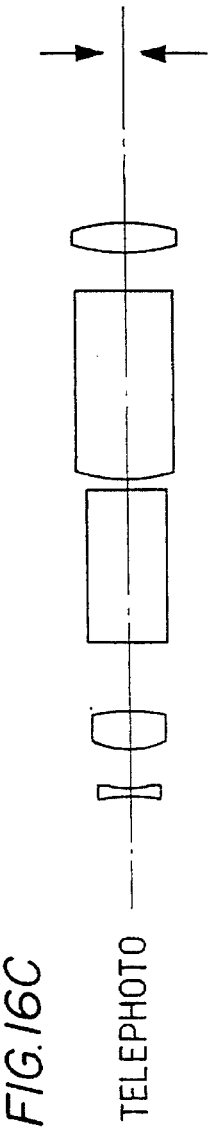
FIG. 16C TELEPHOTO

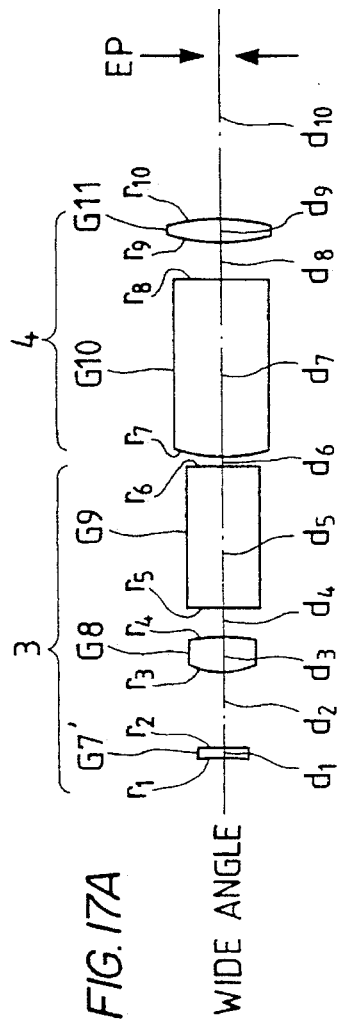
FIG.17A WIDE ANGLE
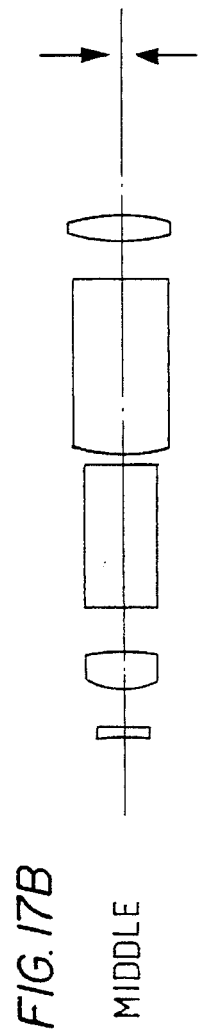
FIG.17B MIDDLE
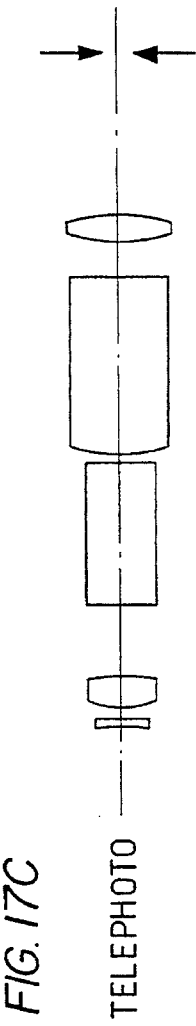
FIG.17C TELEPHOTO SPHERICAL ABERRATION
PUPIL DIA.=2.0mm -1.5 -0.5 +0.5
(diop)

ASTIGMATISM
ω=26.67°

-1.5 -0.5 +0.5
(diop)

DISTORTION
ω=26.67°

-10.   10.
(%)

SPHERICAL ABERRATION
PUPIL DIA.=2.0mm

-1.5 -0.5 +0.5
(diop)

ASTIGMATISM
ω=19.49°

-1.5 -0.5 +0.5
(diop)

DISTORTION
ω=19.49°

-10.   10.
(%)

SPHERICAL ABERRATION
PUPIL DIA.=2.0mm

-1.5 -0.5 +0.5
(diop)

ASTIGMATISM
ω=13.79°

-1.5 -0.5 +0.5
(diop)

DISTORTION
ω=13.79°

-10.   10.
(%)

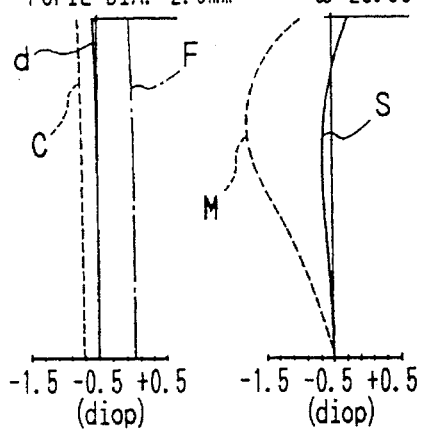
FIG. 19A SPHERICAL ABERRATION PUPIL DIA.=2.0mm
FIG. 19B ASTIGMATISM ω=23.55°
FIG. 19C DISTORTION ω=23.55°
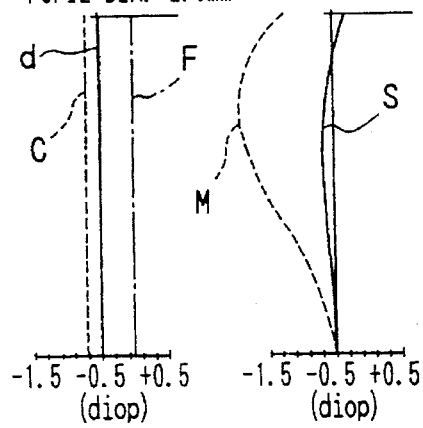
FIG. 19D SPHERICAL ABERRATION PUPIL DIA.=2.0mm
FIG. 19E ASTIGMATISM ω=17.10°
FIG. 19F DISTORTION ω=17.10°
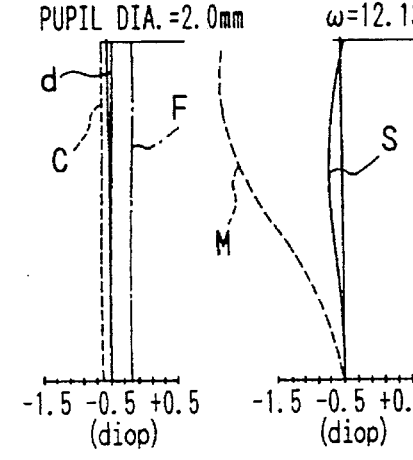
FIG. 19G SPHERICAL ABERRATION PUPIL DIA.=2.0mm
FIG. 19H ASTIGMATISM ω=12.13°
FIG. 19I DISTORTION ω=12.13°

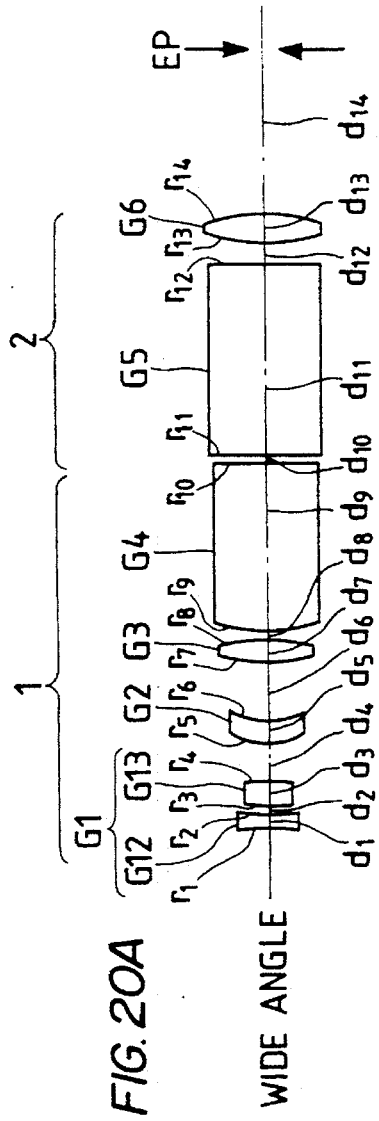
FIG. 20A WIDE ANGLE
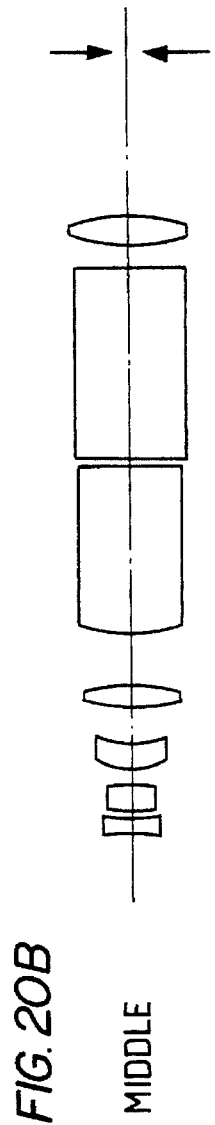
FIG. 20B MIDDLE
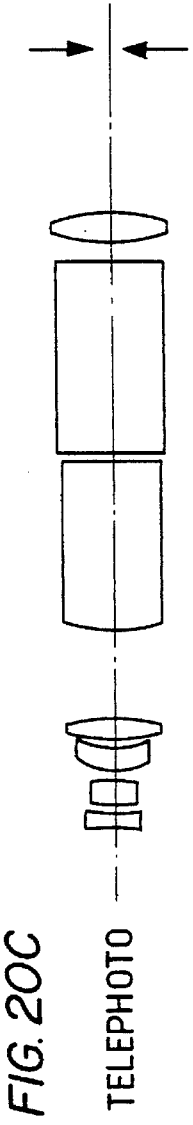
FIG. 20C TELEPHOTO

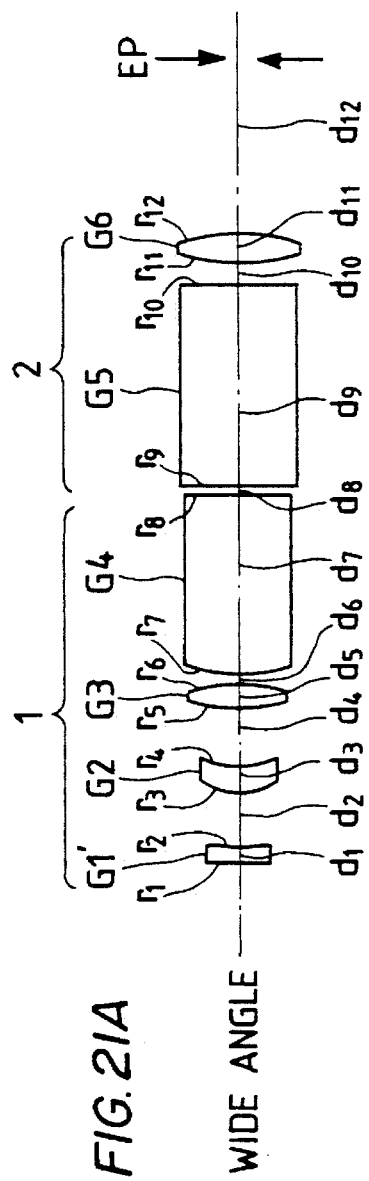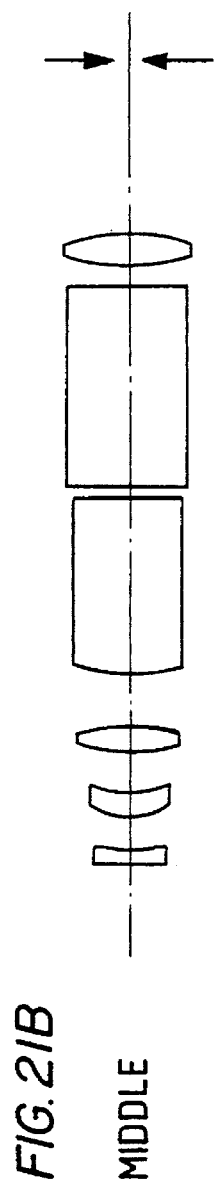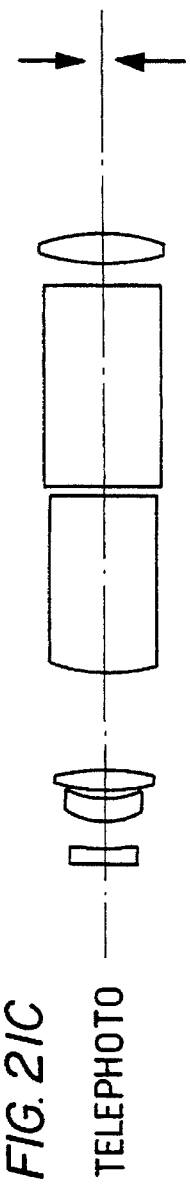
FIG. 21A WIDE ANGLE
FIG. 21B MIDDLE
FIG. 21C TELEPHOTO

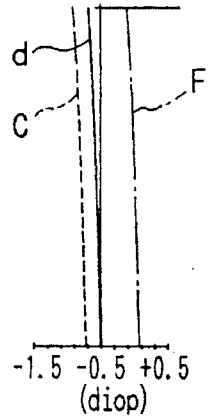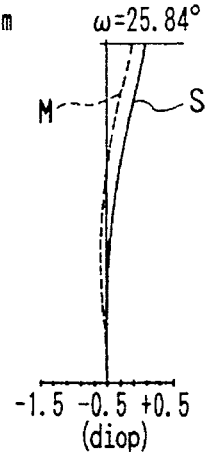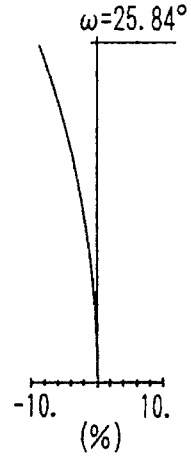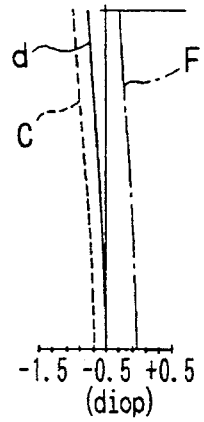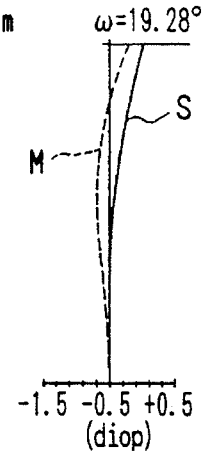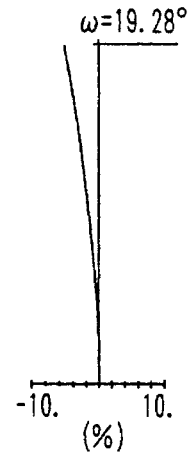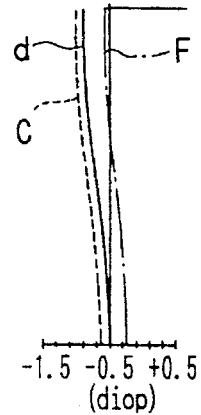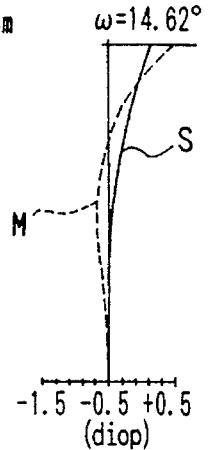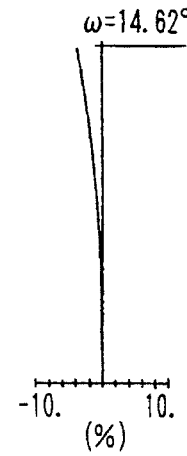

SPHERICAL
ABERRATION
PUPIL DIA.=2.0mm

-1.5 -0.5 +0.5
(diop)

ASTIGMATISM
ω=23.17°

-1.5 -0.5 +0.5
(diop)

DISTORTION
ω=23.17°

-10.    10.
(%)

SPHERICAL
ABERRATION
PUPIL DIA.=2.0mm

-1.5 -0.5 +0.5
(diop)

ASTIGMATISM
ω=17.35°

-1.5 -0.5 +0.5
(diop)

DISTORTION
ω=17.35°

-10.    10.
(%)

SPHERICAL
ABERRATION
PUPIL DIA.=2.0mm

-1.5 -0.5 +0.5
(diop)

ASTIGMATISM
ω=13.24°

-1.5 -0.5 +0.5
(diop)

DISTORTION
ω=13.24°

-10.    10.
(%)

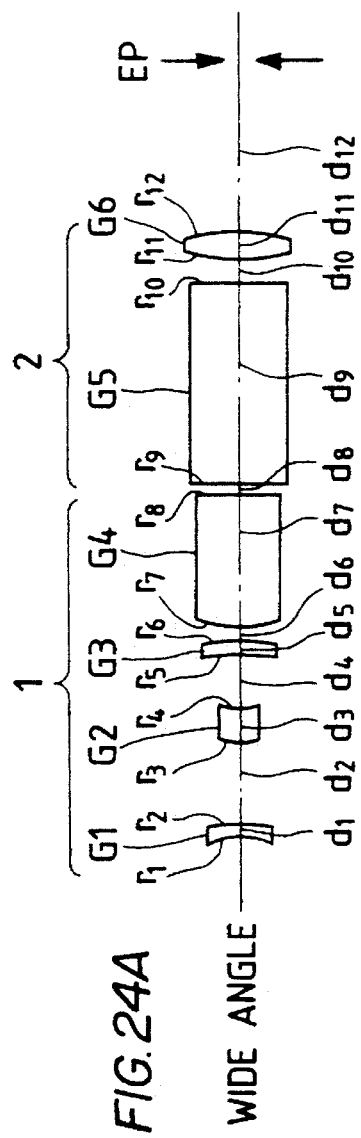
FIG.24A WIDE ANGLE
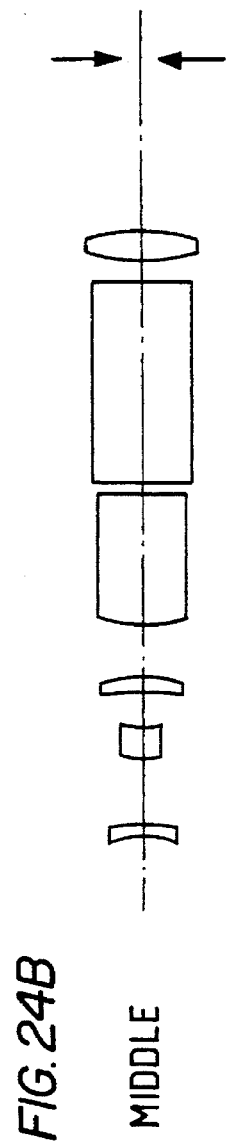
FIG.24B MIDDLE
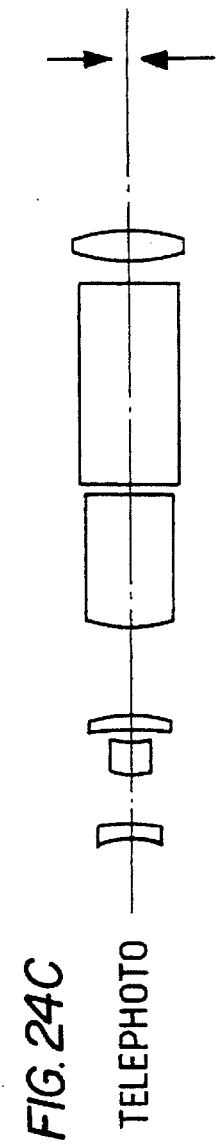
FIG.24C TELEPHOTO

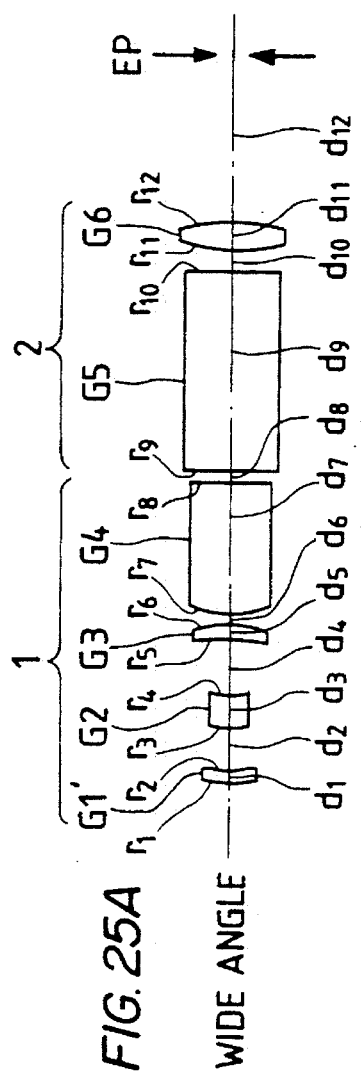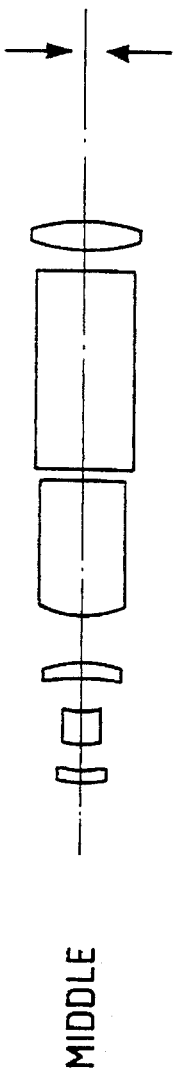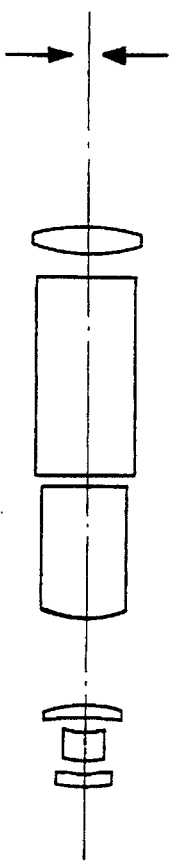
FIG. 25A WIDE ANGLE
FIG. 25B MIDDLE
FIG. 25C TELEPHOTO

FIG.26A
SPHERICAL
ABERRATION
PUPIL DIA.=2.0mm
FIG.26B
ASTIGMATISM
ω=26.39°
FIG.26C
DISTORTION
ω=26.39°
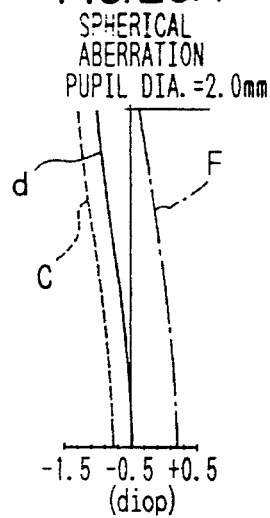
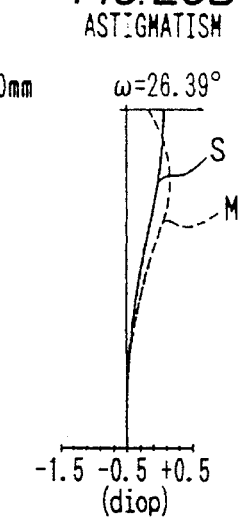
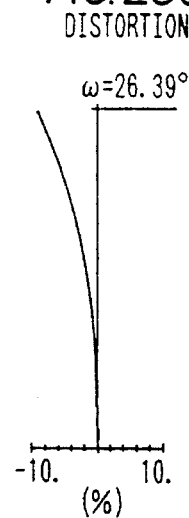
FIG.26D
SPHERICAL
ABERRATION
PUPIL DIA.=2.0mm
FIG.26E
ASTIGMATISM
ω=22.00°
FIG.26F
DISTORTION
ω=22.00°
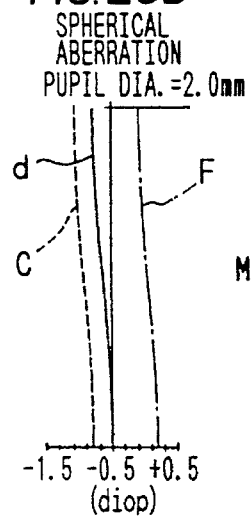
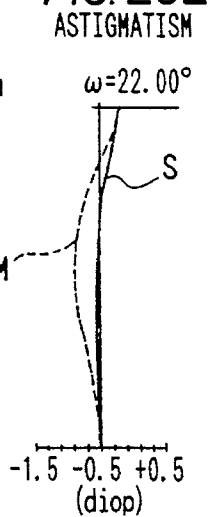
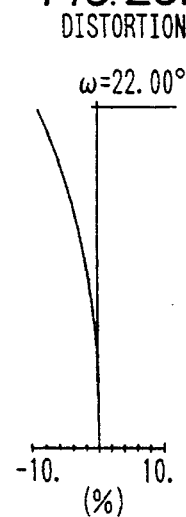
FIG.26G
SPHERICAL
ABERRATION
PUPIL DIA.=2.0mm
FIG.26H
ASTIGMATISM
ω=18.02°
FIG.26I
DISTORTION
ω=18.02°
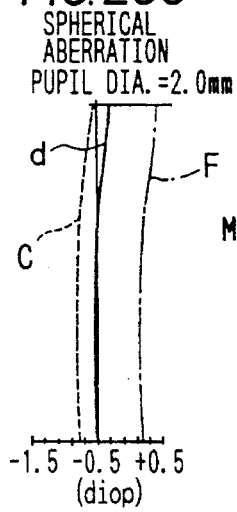
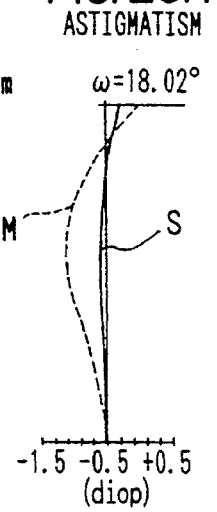
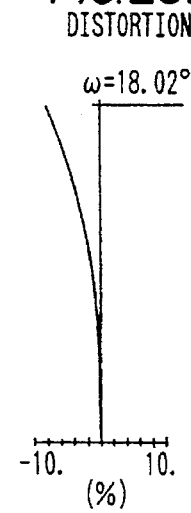

FIG. 27A SPHERICAL ABERRATION PUPIL DIA.=2.0mm
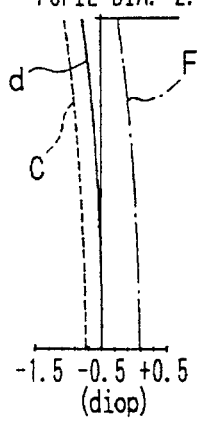
FIG. 27B ASTIGMATISM ω=16.54°
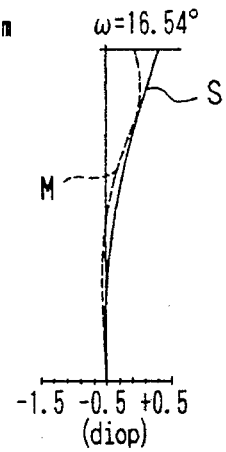
FIG. 27C DISTORTION ω=16.54°
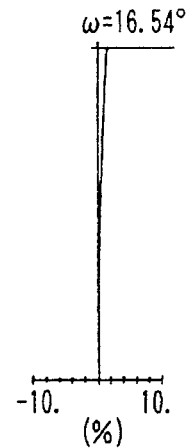
FIG. 27D SPHERICAL ABERRATION PUPIL DIA.=2.0mm
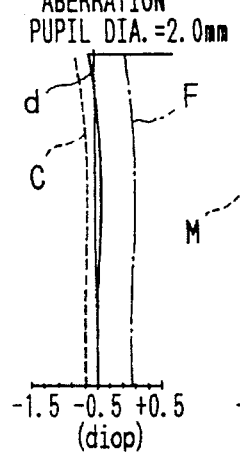
FIG. 27E ASTIGMATISM ω=14.10°
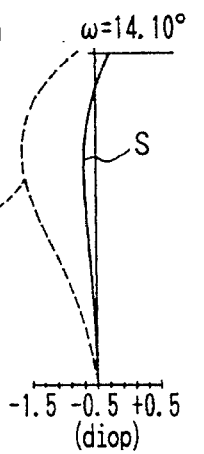
FIG. 27F DISTORTION ω=14.10°
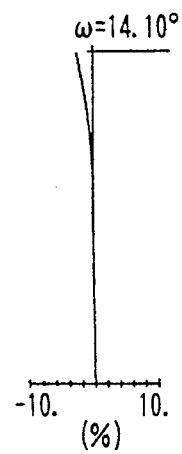
FIG. 27G SPHERICAL ABERRATION PUPIL DIA.=2.0mm
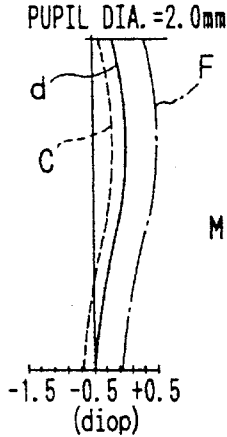
FIG. 27H ASTIGMATISM ω=11.68°
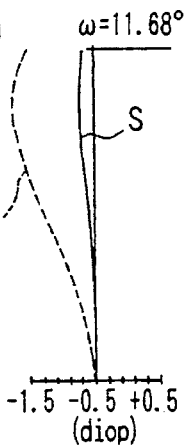
FIG. 27I DISTORTION ω=11.68°
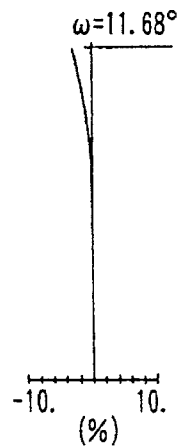

REAL IMAGE MODE VARIABLE MAGNIFICATION FINDER OPTICAL SYSTEM

BACKGROUND OF THE INVENTION

1. Field of the Invention

This invention relates to a real image mode variable magnification finder which is provided with a high-magnification zoom function and which is compact in size, and in particular, to a real image mode variable magnification finder optical system provided on an optical path independent of that of a photographic objective lens.

2. Description of the Related Art

In keeping with the tendency of camera lenses to high magnification and compact design, demands for high-magnification zoom and compaction on a finder optical system have increased. Some cameras are constructed to have the function of panoramic photography that enhances a wide-screen sensitivity of a photographic picture by laterally extending the range in which an image of an object falls on a film. In the finder of such a camera, there is a demand for a panoramic wide-screen sensitivity on the visual field of the finder, as well as for high-magnification zoom and compaction.

For the demand for high-magnification zoom on the finder optical system, if a lens unit of the objective system of the finder is designed to move in its optical path, the zoom function can be easily brought about. In this case, however, the traveling distance of the lens unit increases with increasing the magnification of the finder optical system, and the resulting overall length of the objective system becomes greater. This does not meet the demand of compaction. Also, the method is available that the zoom ratio of the finder optical system is improved by inserting an afocal converter in front of the first lens unit of the finder optical system (refer to Japanese Patent Preliminary Publication No. Hei 4-63313). However, this method, which needs at least two lenses, has the defect of increasing the overall length of the objective system.

As for the demand for compaction on the finder optical system, if the overall length of the finder optical system is intended for reduction, it is necessary to increase the refracting power of each lens. Consequently, the problem has arisen that aberrations deteriorate, and even though aspherical lenses are applied to the optical system, it is difficult to correct the aberrations. If the number of lenses is increased, the deteriorated aberrations may be corrected, but this will not bring about the reduction of the entire length of the optical system.

On the other hand, the panoramic wide-screen sensitivity in the finder visual field can be provided by increasing the magnification of the finder optical system in panoramic photography, and at the same time, by replacing a field frame for ordinary photography with a field frame for panoramic photography in which the field frame for ordinary photography is vertically reduced and horizontally enlarged. In this case also, however, the problem has been encountered that when a change in magnification is made by the movement of the lens unit, as mentioned above, the entire length of the optical system becomes greater. Thus, it is difficult to satisfy the limitations on the characteristics of the lenses of the finder optical system and on its mechanism at once, and to realize the high-magnification zoom and compaction.

SUMMARY OF THE INVENTION

It is, therefore, an object of the present invention to provide a real image mode variable magnification finder optical system in which a high-magnification zoom function is provided, the overall length of the finder section is reduced to realize miniaturization, and aberrations are favorably corrected.

The real image mode variable magnification finder optical system according to the present invention comprises an objective system having a positive refracting power and an eyepiece system having a positive refracting power, and is constructed so that a first lens unit of the objective system is replaced with another lens unit, thereby enabling magnification to be changed in a variable magnification region. The first lens unit of the objective system has a positive or negative refracting power. Concurrently with the replacement of the first lens unit, a field frame defining the range of observation at the intermediate imaging plane is replaced by another field frame of different shape. Moreover, concurrently with the replacement of the first lens unit, a moving lens unit moving to a wide angle or telephoto position in the variable magnification region is further shifted to the other position in the variable magnification region. By providing such a lens moving mechanism, the finder can also be used as an ordinary zoom finder.

Referring now to the drawings, the functions of the present invention will be described. Where the zoom ratio of the finder optical system is increased, if it is intended that this increase is brought about by the movement of the lens unit, the overall length of the objective system will be greater. In the present invention, therefore, the lens unit is replaced with another lens unit of different magnification to obtain a desired zoom magnification, and thereby the traveling distance of the lens unit is diminished so that the increase of the overall length of the objective system is suppressed.

FIG. 1 is a conceptual view showing an optical system of the real image mode variable magnification finder of the present invention. In this figure, reference numeral 1 represents an objective system having a positive refracting power as a whole, which comprises a first lens unit $G_1$ remaining fixed when magnification varies, second and third lens units $G_2$ and $G_3$ moving in the optical path for making the magnification change and diopter correction, and a fourth lens unit $G_4$ composed of a prism for imaging an incident light, after two reflections, at its exit surface. Reference numeral 2 represents an eyepiece system comprising a fifth lens unit $G_5$ composed of a prism for twice-reflecting the incident light and a sixth lens unit $G_6$ having a positive refracting power. Reference symbol EP denotes an eyepoint.

This arrangement is designed so that the magnification change of the finder optical system is made only by the replacement and movement of the lens units in the objective system 1. The operating principles before and after the replacement of the fixed lens unit are shown in FIGS. 2A and 2B, respectively. In these figures, when the first lens unit $G_1$ is fixed, the incident light forms a virtual image ($P_A$, $P_B$) In front of the negative lens. This virtual image is send through the second, third, and fourth lens units $G_2$, $G_3$, and $G_4$ to an intermediate imaging plane ($Q_A$, $Q_B$). Although the positions of the imaging planes $Q_A$ and $Q_B$ are identical irrespective of the zoom state, the positions of object points $P_A$ and $P_B$ corresponding to the imaging planes $Q_A$ and $Q_B$ in the second, third, and fourth lens units $G_2$, $G_3$, and $G_4$ also become identical irrespective of the zoom state. Here, when the first lens unit $G_1$ is replaced with a lens unit $G_1'$ of different focal length, the image will be transmitted in any zoom state, provided the imaging position of the virtual image is caused to coincide with the position of the object point in the second, third, and fourth lens units $G_2$, $G_3$, and $G_4$.

Because the focal length of the first lens unit $G_1$ varies with the magnification of the lens unit to be replaced, when the imaging position of the virtual image is caused to coincide with the position of the object point as mentioned above, the position where the first lens unit $G_1$ is inserted also varies according to the magnification. That is, by changing the position for insertion so as to accommodate the magnification, the diopter correction of the first lens unit $G_1$ can be made. When the first lens unit $G_1$ shown in FIG. 2A is replaced with the lens unit $G_1'$ of greater focal length shown in FIG. 2B, the entire focal length of the objective system, as shown in these figures, changes from $F_1$ to $F_2$. Thus, the zoom distances of the moving lens units $G_2$ and $G_3$ remain unchanged, and by the replacement of the first lens unit $G_1$ for fixation, the magnification change and diopter correction can be made.

Next, in accordance with FIG. 3 and FIGS. 4A and 4B, a reference is made to the operating principle where the first lens unit replaced when magnification varies is a moving lens unit which moves in the optical path to make the magnification change. In FIG. 3, reference numeral 3 designates an objective system. The objective system 3 includes a first lens unit $G_7$ which is replaced in the magnification change and moves in the optical path to make the magnification change and diopter correction, a second lens unit $G_8$ which moves in the optical path to make the magnification change, and a third lens unit $G_9$ for fixation, composed of a prism which after two reflections, images the incident light at its exit surface. Reference numeral 4 designates an eyepiece system including a fourth lens unit $G_{10}$ composed of a prism having a positive refracting power as a whole, for twice-reflecting the incident light, and a fifth lens unit $G_{11}$ having a positive refracting power.

In this arrangement, the magnification change of the finder optical system is made only by the replacement and movement of the lens units in the objective system 3. The operating principles before and after the replacement of the moving lens unit are shown in FIGS. 4A and 4B. In these figures, the diopter correction of the objective system is made by moving the first lens unit $G_7$. In view of the fact that, as mentioned above, the first lens unit $G_7$ is replaced with a lens unit $G_7'$ of different magnification in the magnification change, however, the lens space between the first and second lens units $G_7$ and $G_8$, namely, a zoom cam, needs to be changed. In this case, however, the zoom cam of the second lens unit $G_8$ can be used in common without any change. Thus, the first lens unit may be used as either the fixed lens unit or the moving lens unit.

Although the above method of changing magnification is based on the condition that the zoom distance is made constant, the roles of the magnification change and diopter correction of the first lens unit $G_1$ are separately taken by the second and third lens units $G_2$ and $G_3$, that is, the zoom distances before and after the replacement are made to change, thereby keeping the overall length of the optical system constant.

Where the zoom distances before and after the replacement are constant, when a magnification before the replacement of the first lens unit $G_1$ is represented by $f_A$ and a magnification after the replacement by $f_B$, a variable magnification ratio M secured by the replacement of the first lens unit $G_1$ for fixation is given by $$M = f_B / f_A$$

Similarly, for the first lens unit $G_1$, when a magnification before the replacement is represented by $f_C$ and a magnification after the replacement by $f_D$, a variable magnification ratio M' secured by the replacement of the first lens unit $G_7$ for movement is given by $$M' = f_D / f_C$$

Next, reference is made to a zoom finder for panoramic photography which uses the variable magnification function stated above. In order to provide the finder visual field with the panoramic wide-screen sensitivity, it is only necessary to make the magnification change through the replacement of the lens unit for increase of the magnification of the finder optical system, and at the same time, to replace a field frame for ordinary photography with a field frame for panoramic photography.

In FIG. 5A, a magnification at the wide angle position in an ordinary state N is taken as $M_1$ and a magnification at the telephoto position as $M_2$. In a panoramic state P, a magnification at the wide angle position is taken as $M_3$ and a magnification at the telephoto position as $M_4$. Here, the zoom magnification is assumed to be identical in both states. The relation between the magnifications is expressed as $$M_2/M_1 = M_4/M_3$$

To provide the finder visual field with the wide-screen sensitivity in the panoramic state P, the finder magnification is kept, for example, 1.2 times greater than in the ordinary state N.

In this structure, the magnification change is made from the magnification $M_1$ to the magnification $M_2$ in the ordinary state N to perform the ordinary photography. When the panoramic photography is carried out, the first lens unit is replaced to enlarge the field image of the finder to the size 1.2 times as large, thus bringing the finder magnification into the panoramic state P. In this way, the finder visual field can be provided with the panoramic wide-screen sensitivity in the zoom magnification from the magnification $M_3$ to the magnification $M_4$. Also, in this case, the mechanism is required for replacing the first lens unit to shift from the ordinary state N to the panoramic state P, and at the same time, for replacing the field frame for ordinary photography with the field frame for panoramic photography in which the field frame for ordinary photography is vertically reduced and horizontally enlarged (refer to FIG. 5B).

Next, a description is made of a lens switching zoom finder which has the same principle as the zoom finder for panoramic photography mentioned above. In FIG. 6, a magnification at the wide angle position in a state W on the wide angle side is denoted by $M_1'$ and a magnification at the telephoto position by $M_2'$. A magnification at the wide angle position in a state T on the telephoto side is denoted by $M_3'$ and a magnification at the telephoto position by $M_4'$. The zoom magnification is assumed to be identical in both states. On the wide angle side W, when the magnification change is made from the wide angle position to the telephoto position, the moving lens unit is assumed to have traveled until the finder magnification varies from $M_1'$ to $M_2'$. Here, the first lens unit is replaced, and at the same time, the moving lens unit is returned to the wide angle position. The magnification $M_3'$ at the wide angle position on the telephoto side T is thus obtained. From this state, the moving lens unit is further moved, and the magnification change is made to the magnification $M_4'$ at the telephoto position. In other words, the magnification $M_2'$ at the telephoto position on the wide angle side W is made equal to the magnification $M_3'$ at the wide angle position on the telephoto side T by the replacement of the first lens unit and the movement of the lens unit, thereby allowing continuous zooming in the zoom region from the magnification $M_1'$ to the magnification $M_4'$. Also, in this case, the mechanism is required for shifting the moving lens unit from the wide angle side W to the telephoto side T, or vice versa, in association with the replacement of the first lens unit. The zoom finder equipped with this lens switching mechanism can also be used in bifocal cameras provided with trimming zoom functions in addition to ordinary zoom cameras.

In the finder optical system designed to secure a desired zoom magnification by the replacement of the lens unit as mentioned above, if the principal point of the first lens unit is located near the center of the lens unit, its lens performance will be stabilized. When the ratio of focal length (variable magnification ratio) of the first lens unit to be replaced increases, the position where the lens is inserted is considerably shifted compared with the state before the replacement, and thus the overall length of the objective system may become greater. In this case, it is only necessary to shift the position of the principal point or the lens unit with less focal length, of two first lens units to be replaced, toward the object, thereby suppressing the increase of the overall length of the objective system. At this time, lens performance can be stabilized if the first lens unit satisfies the condition $$|f/F - f'/F'| < 0.50$$

where f and f' are focal lengths of the two first lens units, and F and F' are distances from the first surfaces to the focal positions of the two first lens units when the focal lengths of the two first lens units are f and f'. Beyond the limit of the above equation, astigmatism and coma are produced with the resultant deterioration of lens performance. Of lenses constituting the first lens unit, at least one surface is configured as an aspherical surface, and as a result, lens performance is further improved. For the lens unit replaced, the position of the aspherical lens may well be shifted.

Also, the real image mode variable magnification finder optical system of the present invention, as shown in FIG. 7, is disposed on an optical path independent of that of a photographic objective lens.

This and other objects as well as the features and advantages of the present invention will become apparent from the following detailed description of the preferred embodiments when taken in conjunction with the accompanying drawings.

BRIEF DESCRIPTION OF THE DRAWINGS

FIGS. 8A–8C and 9A–9C are views of optical path development at wide angle, middle, and telephoto positions in ordinary and panoramic photographics, respectively, of a first embodiment of the present invention;

FIGS. 12A–12C and 13A–13C are views of optical path development at wide angle, middle, and telephoto positions in ordinary and panoramic photographics, respectively, of a second embodiment of the present invention;

FIGS. 14A–14I and 15A–15I are aberration curve diagrams of optical systems shown in FIGS. 12A–12C and 13A–13C, respectively;

FIGS. 16A–16C and 17A–17C are views of optical path development at wide angle, middle, and telephoto positions in ordinary and panoramic photographics, respectively, of a third embodiment of the present invention;

FIGS. 18A–18I and 19A–19I are aberration curve diagrams of optical systems shown in FIGS. 16A–16C and 17A–17C, respectively;

FIGS. 20A–20C and 21A–21C are views of optical path development at wide angle, middle, and telephoto positions in ordinary and panoramic photographics, respectively, of a fourth embodiment of the present invention;

FIGS. 22A–22I and 23A–23I are aberration curve diagrams of optical systems shown in FIGS. 20A–20C and 21A–21C, respectively;

FIGS. 24A–24C and 25A–25C are views of optical path development at wide angle, middle, and telephoto positions on the wide angle and telephoto sides, respectively, of a fifth embodiment of the present invention; and FIGS. 26A–26I and 27A–27I are aberration curve diagrams of optical systems shown in FIGS. 24A–24C and 25A–25C, respectively.

DETAILED DESCRIPTION OF THE PREFERRED EMBODIMENTS

Figure 1:
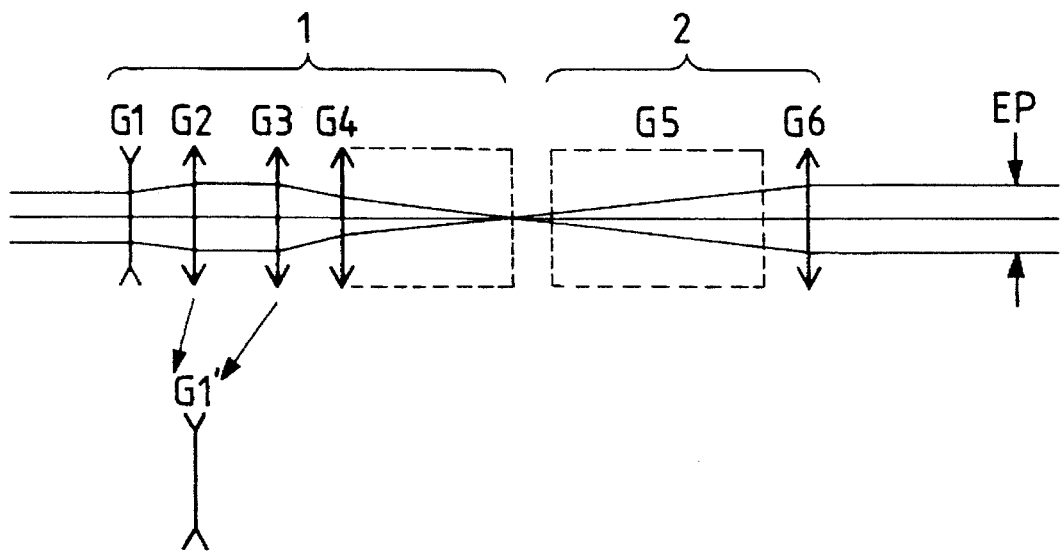
FIG. 1 is a conceptional view showing a real image mode variable magnification finder optical system of the present invention where a fixed lens unit of an objective system is replaced.
Figure 2A:
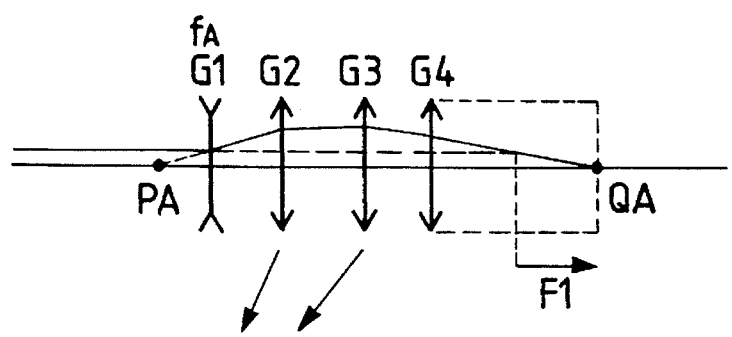
FIGS. 2A and 2B are views showing operating principles of the real image mode variable magnification finder optical system, before and after the replacement of the fixed lens unit, respectively.
Figure 2B:
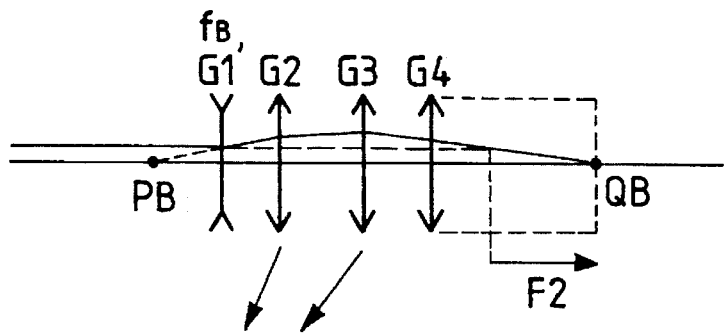
Figure 3:
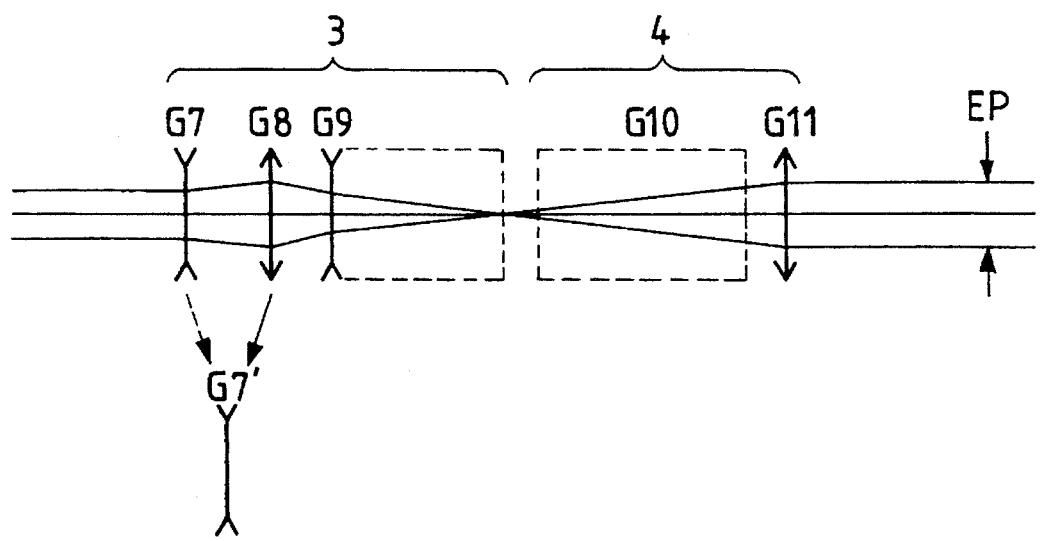
FIG. 3 is a conceptional view showing an optical system of the real image mode variable magnification finder optical system of the present invention where a moving lens unit of the objective system is replaced.
Figure 4A:
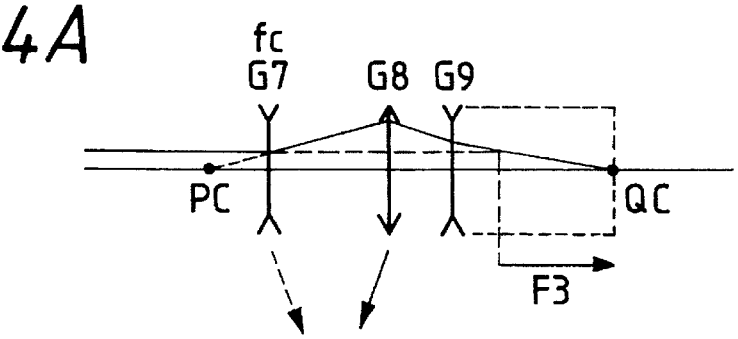
FIGS. 4A and 4B are views showing operating principles of the real image mode variable magnification finder optical system, before and after the replacement of the moving lens unit, respectively.
Figure 4B:
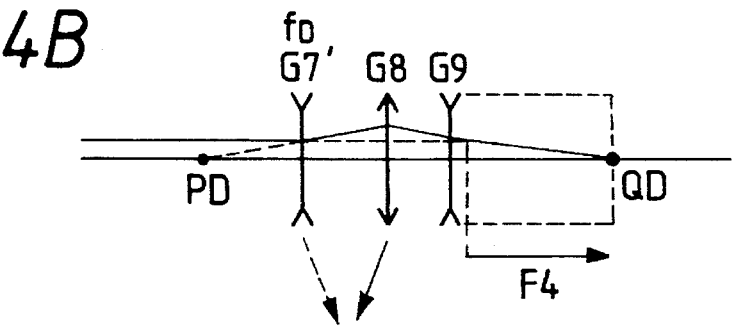
Figure 5A:
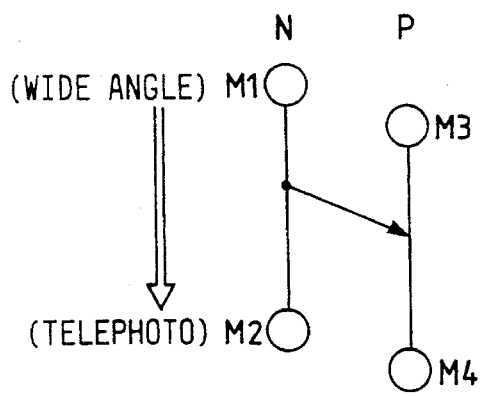
FIGS. 5A and 5B are schematic views showing the principle of the magnification change of a zoom finder equipped with a field frame switching mechanism in panoramic photography and showing contours of field frames for switching.
Figure 5B:
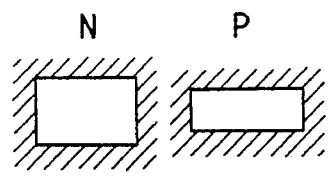
Figure 6:
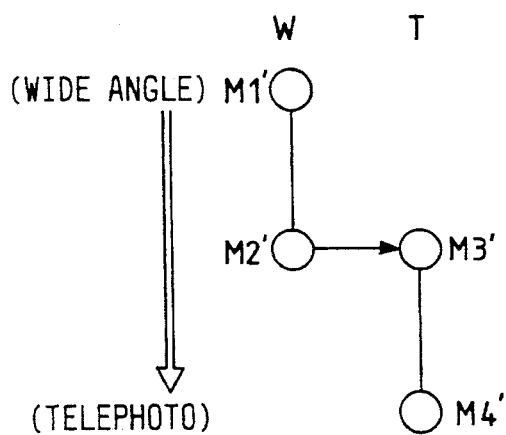
FIG. 6 is a schematic view showing the principle of the magnification change of a zoom finder provided with a lens switching function.
Figure 7:
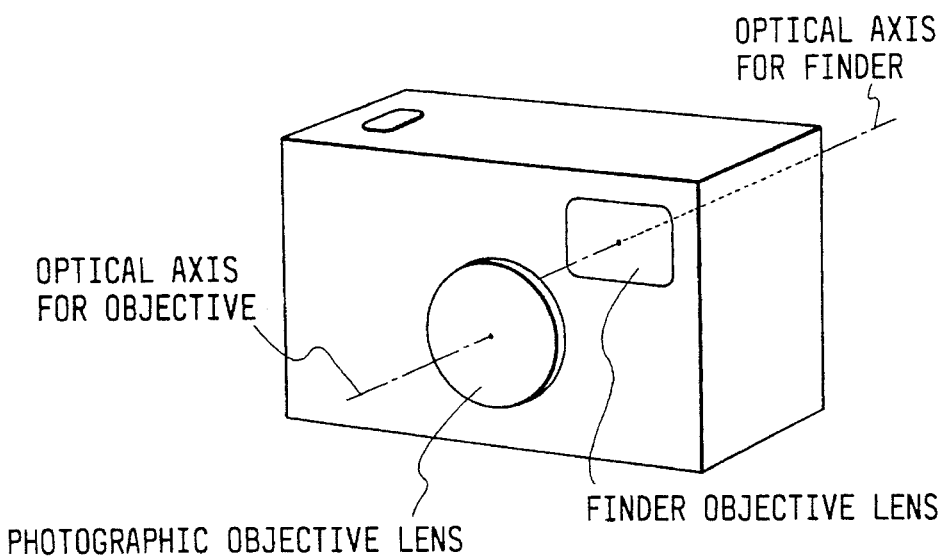
FIG. 7 is an explanatory view showing that the finder optical system of the present invention is provided on an optical path independent of that of a photographic objective lens.

In accordance with the embodiments shown in the drawings, the present invention will be explained in detail below.

First Embodiment

In FIGS. 8A–8C, an image of an object not shown, in the ordinary photography, passes through the objective system 1 comprising the first lens unit $G_1$ for fixation, having a negative refracting power, the second lens unit $G_2$ moving in the optical path for making the magnification change, the third lens unit $G_3$ for making likewise the magnification change, and the fourth lens unit $G_4$ composed of a prism having two reflecting surfaces, and is formed as the intermediate image at the exit surface of the fourth lens unit $G_4$.

Further, the image traverses the field frame (not shown) disposed at this exit surface and is observed through the eyepiece system 2 comprising the fifth lens unit $G_5$ composed of a prism having two reflecting surfaces and the sixth lens unit $G_6$ for fixation.

In the panoramic photography, the first lens unit $G_1$ for fixation, as shown in FIGS. 9A–9C, is replaced with the fixed lens unit $G_1'$ of greater focal length. Further, for diopter correction, the position where the fixed lens unit $G_1'$ is inserted is made to differ from the position of the first lens unit $G_1$. Thus, the focal length of the objective system 1 becomes greater and the finder magnification increases. At the same time, instead of an ordinary field frame, a panoramic field frame is placed which is formed into a size for field observation in which the ordinary field frame is vertically reduced and horizontally enlarged. Hence, in the panoramic photography, the finder visual field is provided with the wide-screen sensitivity in the whole zoom range.

According to the first embodiment, the magnification change can be made to attain a desired magnification, without changing the positions of the moving lens units, only by the replacement of the first lens unit $G_1$ for fixation. Thus, the finder optical system has the advantage that its arrangement is extremely simplified.

Figure 10A:
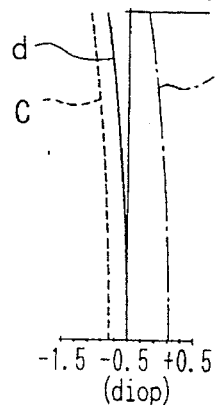
FIGS. 10A–10I and 11A–11I are aberration curve diagrams of optical systems shown in FIGS. 8A–8C and 9A–9C, respectively.
Figure 10B:
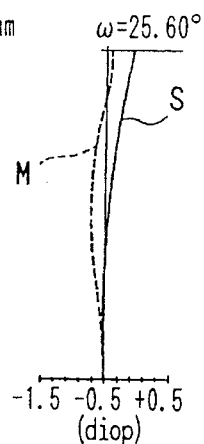
Figure 10C:
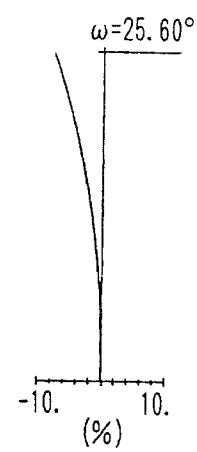
Figure 10D:
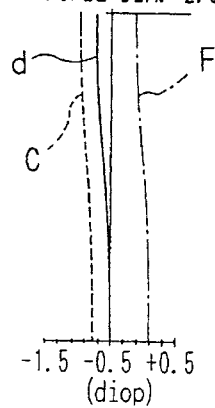
Figure 10E:
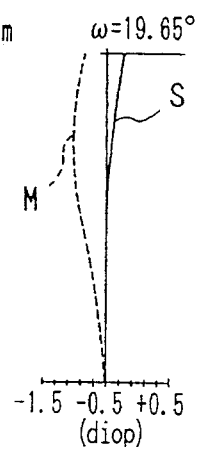
Figure 10F:
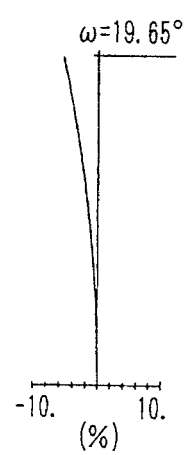
Figure 10G:
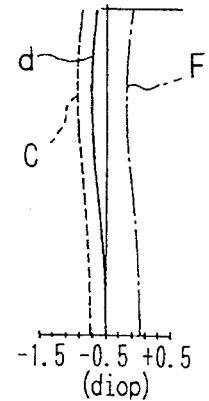
Figure 10H:
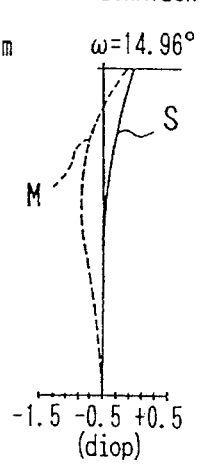
Figure 10I:
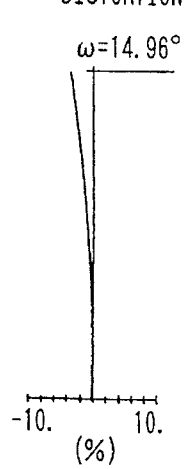
Figure 11A:
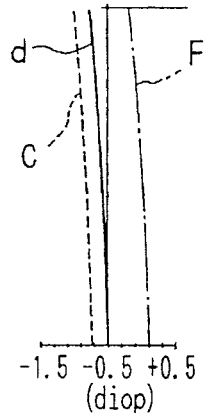
Figure 11B:
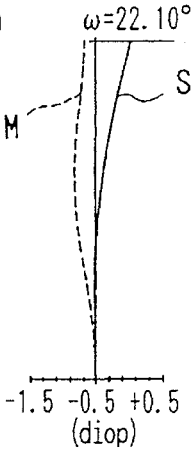
Figure 11C:
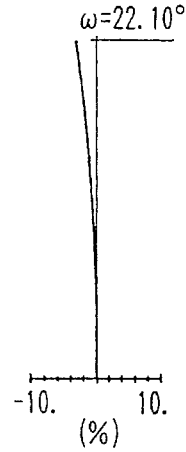
Figure 11D:
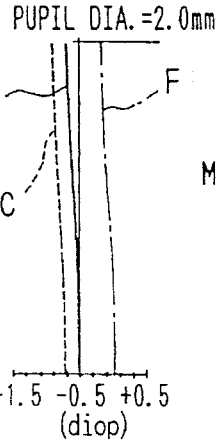
Figure 11E:
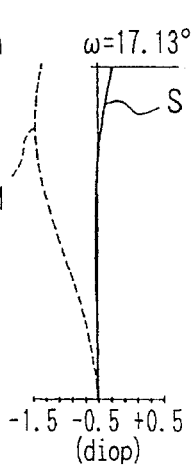
Figure 11F:
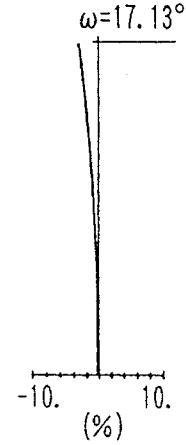
Figure 11G:
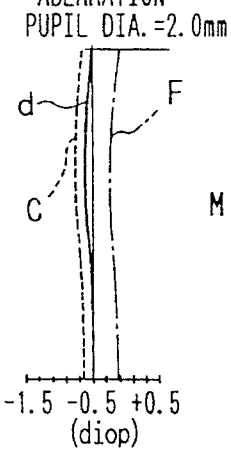
Figure 11H:
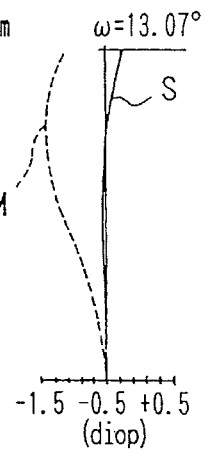
Figure 11I:
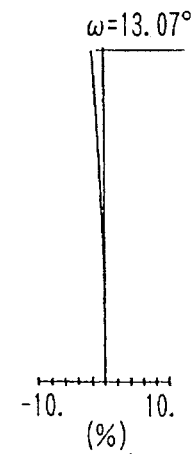

The numerical data of the optical systems shown in FIGS. 8A–8C and 9A–9C are given below. Their aberration curve diagrams are shown in FIGS. 10A–10I and 11A–11I. Also, in the numerical data, since an actual picture plane in the panoramic photography is made smaller than that in the ordinary photography, an angle of incidence ($2\omega$) in the panoramic photography may be small compared with that in the ordinary photography.

Condition $|f/F - f'/F'| = 0.035$
Variable magnification ratio of the first lens unit
$f_B/f_A = 1.2$
<Ordinary photography>
Magnification 0.40–0.53–0.69
Incident angle ($2\omega$) 51.2°–39.3°–29.9°

| | | | |
|---|---|---|---|
| $r_1 = -12.3825$ | $d_1 = 1.500$ | $n_1 = 1.58423$ | $v_1 = 30.49$ |
| $r_2 = 15.7132$ (aspherical) | $d_2 = D_1$ (variable) | | |
| $r_3 = 4.8530$ (aspherical) | $d_3 = 2.679$ | $n_2 = 1.49241$ | $v_2 = 57.66$ |
| $r_4 = 6.9773$ | $d_4 = D_2$ (variable) | | |
| $r_5 = 35.3666$ | $d_5 = 3.000$ | $n_3 = 1.49241$ | $v_3 = 57.66$ |
| $r_6 = -12.8808$ (aspherical) | $d_6 = D_3$ (variable) | | |
| $r_7 = 14.5848$ | $d_7 = 21.000$ | $n_4 = 1.49241$ | $v_4 = 57.66$ |
| $r_8 = \infty$ | $d_8 = 1.000$ | | |
| $r_9 = \infty$ | $d_9 = 23.500$ | $n_5 = 1.49241$ | $v_5 = 57.66$ |
| $r_{10} = \infty$ | $d_{10} = 2.800$ | | |
| $r_{11} = 22.0089$ | $d_{11} = 3.207$ | $n_6 = 1.49241$ | $v_6 = 57.66$ |
| $r_{12} = -18.5397$ (aspherical) | $d_{12} = 20.000$ | | |
| $r_{13} =$ (eyepoint) | | | |

Aspherical coefficients

Second surface ($r_2$)

$P = 1.0000$, $A_4 = -0.11160 \times 10^{-2}$,
$A_6 = -0.60080 \times 10^{-5}$, $A_8 = 0.10430 \times 10^{-5}$ Third surface ($r_3$)

$P = 1.0000$, $A_4 = -0.15731 \times 10^{-2}$,

-continued $A_6 = 0.92218 \times 10^{-5}$, $A_8 = -0.21136 \times 10^{-5}$
Sixth surface ($r_6$)

$P = 1.0000$, $A_4 = 0.12234 \times 10^{-3}$,
$A_6 = -0.18250 \times 10^{-5}$, $A_8 = 0.45131 \times 10^{-7}$
Twelfth surface ($r_{12}$)

$P = 1.0000$, $A_4 = 0.74822 \times 10^{-4}$,
$A_6 = -0.50612 \times 10^{-6}$, $A_8 = 0.54551 \times 10^{-8}$ Zoom data (variable space)

| | Wide angle position | Middle position | Telephoto position |
|---|---|---|---|
| $D_1$ | 6.3113 | 4.6433 | 4.1973 |
| $D_2$ | 9.9194 | 6.3172 | 1.5016 |
| $D_3$ | 1.0000 | 6.2702 | 11.5319 |

<Panoramic photography>
Magnification 0.48–0.64–0.83
Incident angle ($2\omega$) 44.2°–34.3°–26.1°

| | | | |
|---|---|---|---|
| $r_1 = -51.3650$ | $d_1 = 1.000$ | $n_1 = 1.58423$ | $v_1 = 30.49$ |
| $r_2 = 9.7763$ (aspherical) | $d_2 = D_1$ (variable) | | |
| $r_3 = 4.8530$ (aspherical) | $d_3 = 2.679$ | $n_2 = 1.49241$ | $v_2 = 57.66$ |
| $r_4 = 6.9773$ | $d_4 = D_2$ (variable) | | |
| $r_5 = 35.3666$ | $d_5 = 3.000$ | $n_3 = 1.49241$ | $v_3 = 57.66$ |
| $r_6 = -12.8808$ (aspherical) | $d_6 = D_3$ (variable) | | |
| $r_7 = 14.5848$ | $d_7 = 21.000$ | $n_4 = 1.49241$ | $v_4 = 57.66$ |
| $r_8 = \infty$ | $d_8 = 1.000$ | | |
| $r_9 = \infty$ | $d_9 = 23.500$ | $n_5 = 1.49241$ | $v_5 = 57.66$ |
| $r_{10} = \infty$ | $d_{10} = 2.800$ | | |
| $r_{11} = 22.0089$ | $d_{11} = 3.207$ | $n_6 = 1.49241$ | $v_6 = 57.66$ |
| $r_{12} = -18.5397$ (aspherical) | $d_{12} = 20.000$ | | |
| $r_{13} =$ (eyepoint) | | | |

Aspherical coefficients

Second surface ($r_2$)

$P = 1.0000$, $A_4 = -0.94213 \times 10^{-3}$,
$A_6 = 0.83014 \times 10^{-5}$, $A_8 = -0.95541 \times 10^{-8}$
Third surface ($r_3$)

$P = 1.0000$, $A_4 = -0.15731 \times 10^{-2}$,
$A_6 = 0.92218 \times 10^{-5}$, $A_8 = -0.21136 \times 10^{-5}$
Sixth surface ($r_6$)

$P = 1.0000$, $A_4 = 0.12234 \times 10^{-3}$,
$A_6 = -0.18250 \times 10^{-5}$, $A_8 = 0.45131 \times 10^{-7}$
Twelfth surface ($r_{12}$)

$P = 1.0000$, $A_4 = 0.74822 \times 10^{-4}$,
$A_6 = -0.50612 \times 10^{-6}$, $A_8 = 0.54551 \times 10^{-8}$ Zoom data (variable space)

| | Wide angle position | Middle position | Telephoto position |
|---|---|---|---|
| $D_1$ | 4.4012 | 2.7332 | 2.2872 |
| $D_2$ | 9.9194 | 6.3172 | 1.5016 |
| $D_3$ | 1.0000 | 6.2702 | 11.5319 |

Second Embodiment

In FIGS. 12A–12C and 13A–13C, this embodiment includes the lens units identical with the first embodiment. In the ordinary and panoramic photographics, the zoom distance between the second lens unit $G_2$ and the third lens unit $G_3$ are varied so that the overall length of the finder optical system is kept constant. The effects of the magnification change and diopter correction associated with the replacement of the first lens unit $G_1$ are produced by the variation of the zoom distance between the second lens unit $G_2$ and the third lens unit $G_3$. According to the arrangement of the second embodiment, therefore, the first lens unit $G_1$ can be always inserted at the same position and the lens unit to be replaced can be integrally constructed. Thus, the finder optical system has the advantage that when the lens unit is replaced or inserted, decentering is hard to occur.

Figure 15A:
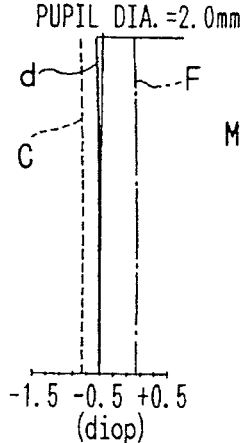
Figure 15B:
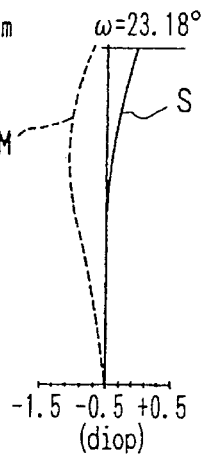
Figure 15C:
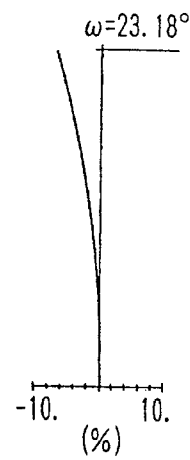
Figure 15D:
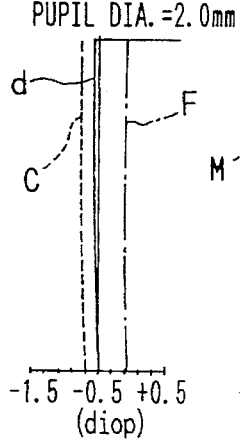
Figure 15E:
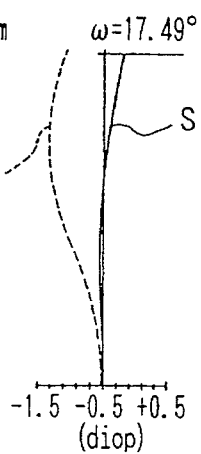
Figure 15F:
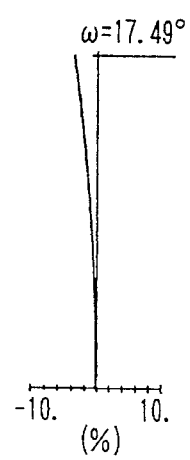
Figure 15G:
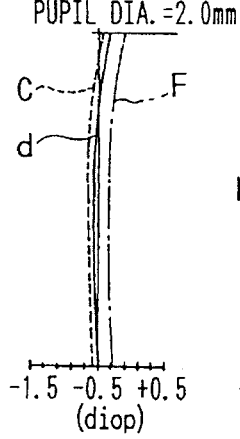
Figure 15H:
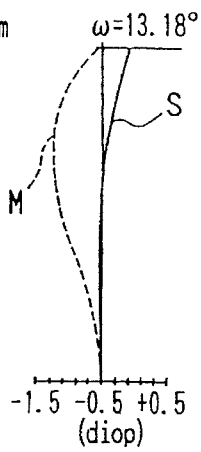
Figure 15I:
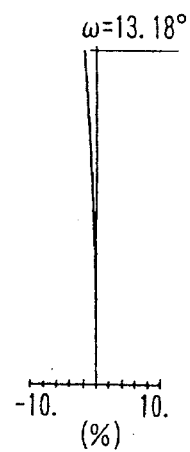

The numerical data of the optical systems shown in FIGS. 12A–12C and 13A–13C are given below. Their aberration curve diagrams are shown in FIGS. 14A–14I and 15A–15I.

Condition $| f/F - f'/F' | = 0.012$
Variable magnification ratio of the first lens unit
$f_B/f_A = 1.065$
<Ordinary photography>
Magnification 0.40–0.53–0.69
Incident angle (2ω) 51.1°–39.0°–29.7°

| | | | |
|---|---|---|---|
| $r_1 = -26.0934$ | $d_1 = 1.000$ | $n_1 = 1.58423$ | $v_1 = 30.49$ |
| $r_2 = 8.4387$ (aspherical) | $d_2 = D_1$ (variable) | | |
| $r_3 = 8.9154$ (aspherical) | $d_3 = 1.500$ | $n_2 = 1.49241$ | $v_2 = 57.66$ |
| $r_4 = 42.5815$ | $d_4 = D_2$ (variable) | | |
| $r_5 = 21.1462$ | $d_5 = 3.302$ | $n_3 = 1.49241$ | $v_3 = 57.66$ |
| $r_6 = -13.3652$ (aspherical) | $d_6 = D_3$ (variable) | | |
| $r_7 = 18.4488$ | $d_7 = 21.000$ | $n_4 = 1.49241$ | $v_4 = 57.66$ |
| $r_8 = \infty$ | $d_8 = 1.000$ | | |
| $r_9 = \infty$ | $d_9 = 23.500$ | $n_5 = 1.49241$ | $v_5 = 57.66$ |
| $r_{10} = \infty$ | $d_{10} = 2.803$ | | |
| $r_{11} = 22.9085$ | $d_{11} = 3.148$ | $n_6 = 1.49241$ | $v_6 = 57.66$ |
| $r_{12} = -17.9799$ (aspherical) | $d_{12} = 20.000$ | | |
| $r_{13} =$ (eyepoint) | | | |

Aspherical coefficients

Second surface ($r_2$)

$P = 1.0000$,   $A_4 = -0.40947 \times 10^{-3}$,
$A_6 = -0.30308 \times 10^{-4}$,   $A_8 = 0.15734 \times 10^{-5}$
Third surface ($r_3$)

$P = 1.0000$,   $A_4 = -0.42947 \times 10^{-3}$,
$A_6 = -0.64986 \times 10^{-6}$,   $A_8 = -0.19813 \times 10^{-6}$
Sixth surface ($r_6$)

$P = 1.0000$,   $A_4 = 0.14218 \times 10^{-3}$,
$A_6 = -0.56906 \times 10^{-6}$,   $A_8 = 0.21351 \times 10^{-7}$
Twelfth surface ($r_{12}$)

$P = 1.0000$,   $A_4 = 0.76433 \times 10^{-4}$,
$A_6 = -0.54360 \times 10^{-6}$,   $A_8 = 0.57532 \times 10^{-8}$ Zoom data (variable space)

| | Wide angle position | Middle position | Telephoto position |
|---|---|---|---|
| $D_1$ | 4.3210 | 2.4933 | 1.9287 |
| $D_2$ | 10.8952 | 8.1817 | 4.1659 |
| $D_3$ | 1.0000 | 5.5412 | 10.1227 |

<Panoramic photography>
Magnification 0.48–0.64–0.83
Incident angle (2ω) 46.4°–35.0°–26.4°

| | | | |
|---|---|---|---|
| $r_1 = -30.8006$ | $d_1 = 2.490$ | $n_1 = 1.58423$ | $v_1 = 30.49$ |
| $r_2 = 8.8501$ (aspherical) | $d_2 = D_1$ (variable) | | |
| $r_3 = 8.9154$ (aspherical) | $d_3 = 1.500$ | $n_2 = 1.49241$ | $v_2 = 57.66$ |
| $r_4 = 42.5815$ | $d_4 = D_2$ (variable) | | |
| $r_5 = 21.1462$ | $d_5 = 3.302$ | $n_3 = 1.49241$ | $v_3 = 57.66$ |
| $r_6 = -13.3652$ (aspherical) | $d_6 = D_3$ (variable) | | |
| $r_7 = 18.4488$ | $d_7 = 21.000$ | $n_4 = 1.49241$ | $v_4 = 57.66$ |
| $r_8 = \infty$ | $d_8 = 1.000$ | | |
| $r_9 = \infty$ | $d_9 = 23.500$ | $n_5 = 1.49241$ | $v_5 = 57.66$ |
| $r_{10} = \infty$ | $d_{10} = 2.803$ | | |
| $r_{11} = 22.9085$ | $d_{11} = 3.148$ | $n_6 = 1.49241$ | $v_6 = 57.66$ |
| $r_{12} = -17.9799$ (aspherical) | $d_{12} = 20.000$ | | |
| $r_{13} =$ (eyepoint) | | | |

Aspherical coefficients

Second surface ($r_2$)

$P = 1.0000$,   $A_4 = -0.40905 \times 10^{-3}$,
$A_6 = -0.30308 \times 10^{-4}$,   $A_8 = 0.15734 \times 10^{-5}$
Third surface ($r_3$)

$P = 1.0000$,   $A_4 = -0.42947 \times 10^{-3}$,
$A_6 = -0.64986 \times 10^{-6}$,   $A_8 = -0.19813 \times 10^{-6}$
Sixth surface ($r_6$)

$P = 1.0000$,   $A_4 = 0.14218 \times 10^{-3}$,
$A_6 = -0.56906 \times 10^{-6}$,   $A_8 = 0.21351 \times 10^{-7}$
Twelfth surface ($r_{12}$)

$P = 1.0000$,   $A_4 = 0.76433 \times 10^{-4}$,
$A_6 = -0.54360 \times 10^{-6}$,   $A_8 = 0.57532 \times 10^{-8}$ Zoom data (variable space)

| | Wide angle position | Middle position | Telephoto position |
|---|---|---|---|
| $D_1$ | 2.6060 | 1.4086 | 1.1928 |
| $D_2$ | 9.3167 | 5.9585 | 1.4632 |
| $D_3$ | 2.8074 | 7.3630 | 12.0740 |

Third Embodiment

In this embodiment, the first lens unit is constructed with a moving lens unit. In FIGS. 16A–16C, the finder optical system of the third embodiment comprises the objective system 3 including the first and second lens units $G_7$ and $G_8$ moving in the optical path for making the magnification change, and the third lens unit $G_9$ composed of a prism having two reflecting surfaces, and the eyepiece system 4 including the fourth lens unit $G_{10}$ composed of a prism having two reflecting surfaces and the fifth lens unit $G_{11}$ for fixation. The first lens unit $G_7$ is adapted to make the diopter correction in association with the movement of the second lens unit $G_8$. Thus, when the first lens unit $G_7$ is replaced with the lens unit $G_7'$ of different focal length, the position where the lens unit is inserted is shifted, that is, the first lens unit $G_7'$ is moved, so that the zoom distance is altered with respect to the second lens unit $G_8$ (refer to FIG. 17A–17C).

According to the arrangement of the third embodiment, the alteration of the zoom distance in the first lens unit $G_7$ makes it possible to adjust the effects of the magnification change and diopter correction, with the resultant advantage that the fixed lens unit is not required and cost is reduced.

Figure 18A:
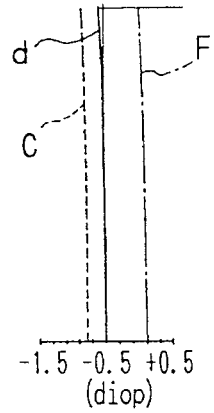
Figure 18B:
Figure 18C:
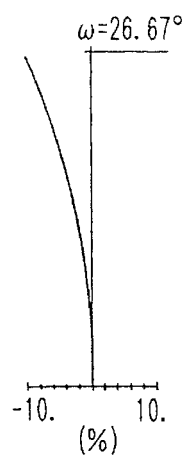
Figure 18D:
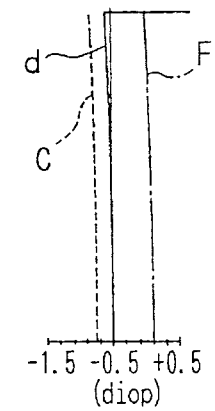
Figure 18E:
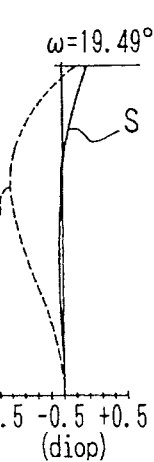
Figure 18F:
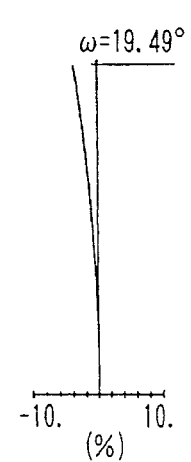
Figure 18G:
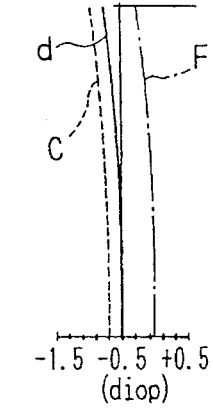
Figure 18H:
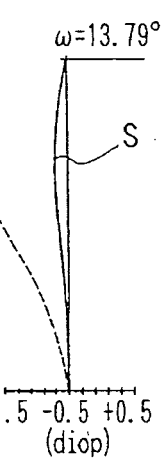
Figure 18I:
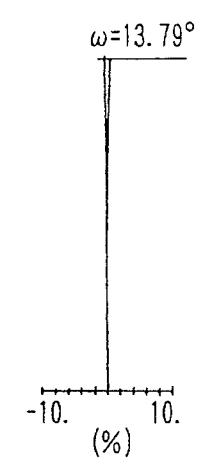

The numerical data of the optical systems shown in FIGS. 16A–16C and 17A–17C are given below. Their aberration curve diagrams are shown in FIGS. 18A–18I and 19A–19I.

Condition $| f/F - f'/F' | = 0.009$
Variable magnification ratio of the first lens unit
$f_B/f_A = 1.20$
<Ordinary photography>
Magnification 0.42–0.57–0.77
Incident angle (2ω) 53.3°–39.0°–27.6°

| | | | |
|---|---|---|---|
| $r_1 = -22.2549$ | $d_1 = 1.000$ | $n_1 = 1.58423$ | $v_1 = 30.49$ |
| $r_2 = 13.9556$ (aspherical) | $d_2 = D_1$ (variable) | | |
| $r_3 = 7.8093$ (aspherical) | $d_3 = 4.500$ | $n_2 = 1.49241$ | $v_2 = 57.66$ |
| $r_4 = -11.9982$ | $d_4 = D_2$ (variable) | | |
| $r_5 = -187.6750$ (aspherical) | $d_5 = 18.000$ | $n_3 = 1.58423$ | $v_3 = 30.49$ |
| $r_6 = \infty$ | $d_6 = 1.000$ | | |
| $r_7 = 16.5801$ | $d_7 = 22.000$ | $n_4 = 1.49241$ | $v_4 = 57.66$ |
| $r_8 = \infty$ | $d_8 = 4.719$ | | |
| $r_9 = 21.6436$ (aspherical) | $d_9 = 3.000$ | $n_5 = 1.49241$ | $v_5 = 57.66$ |
| $r_{10} = -20.3063$ | $d_{10} = 20.000$ | | |
| $r_{11} =$ (eyepoint) | | | |

Aspherical coefficients

Second surface ($r_2$)

$P = 1.0000$, $A_4 = -0.11707 \times 10^{-3}$,
$A_6 = 0.75949 \times 10^{-5}$, $A_8 = 0.68770 \times 10^{-6}$
Fourth surface ($r_4$)

$P = 1.0000$, $A_4 = 0.67757 \times 10^{-3}$,
$A_6 = 0.44342 \times 10^{-5}$, $A_8 = 0.68511 \times 10^{-7}$
Fifth surface ($r_5$)

$P = 1.0000$, $A_4 = -0.21030 \times 10^{-3}$,
$A_6 = 0.12608 \times 10^{-4}$, $A_8 = -0.65852 \times 10^{-6}$
Ninth surface ($r_9$)

$P = 1.0000$, $A_4 = -0.81900 \times 10^{-4}$,
$A_6 = -0.44497 \times 10^{-6}$, $A_8 = -0.23788 \times 10^{-9}$ Zoom data (variable space)

| | Wide angle position | Middle position | Telephoto position |
|---|---|---|---|
| $D_1$ | 12.6408 | 8.1744 | 4.3633 |
| $D_2$ | 3.3592 | 5.2739 | 8.2714 |

<Panoramic photography>
Magnification 0.50–0.68–0.92
Incident angle (2ω) 47.1°–34.2°–24.3°

| | | | |
|---|---|---|---|
| $r_1 = -14.0362$ | $d_1 = 1.000$ | $n_1 = 1.58423$ | $v_1 = 30.49$ |
| $r_2 = 38.1505$ (aspherical) | $d_2 = D_1$ (variable) | | |
| $r_3 = 7.8093$ | $d_3 = 4.500$ | $n_2 = 1.49241$ | $v_2 = 57.66$ |
| $r_4 = -11.9982$ (aspherical) | $d_4 = D_2$ (variable) | | |
| $r_5 = -187.6750$ (aspherical) | $d_5 = 18.000$ | $n_3 = 1.58423$ | $v_3 = 30.49$ |
| $r_6 = \infty$ | $d_6 = 1.000$ | | |
| $r_7 = 16.5801$ | $d_7 = 22.000$ | $n_4 = 1.49241$ | $v_4 = 57.66$ |
| $r_8 = \infty$ | $d_8 = 4.719$ | | |
| $r_9 = 21.6436$ (aspherical) | $d_9 = 3.000$ | $n_5 = 1.49241$ | $v_5 = 57.66$ |
| $r_{10} = -20.3063$ | $d_{10} = 20.000$ | | |
| $r_{11} =$ (eyepoint) | | | |

Aspherical coefficients

Second surface ($r_2$)

$P = 1.0000$, $A_4 = -0.39930 \times 10^{-4}$,
$A_6 = -0.11910 \times 10^{-4}$, $A_8 = 0.17850 \times 10^{-5}$ Fourth surface ($r_4$)

$P = 1.0000$, $A_4 = 0.67757 \times 10^{-3}$,
$A_6 = 0.44342 \times 10^{-5}$, $A_8 = 0.68511 \times 10^{-7}$
Fifth surface ($r_5$)

$P = 1.0000$, $A_4 = -0.21030 \times 10^{-3}$,
$A_6 = 0.12608 \times 10^{-4}$, $A_8 = -0.65852 \times 10^{-6}$
Ninth surface ($r_9$)

$P = 1.0000$, $A_4 = -0.81900 \times 10^{-4}$,
$A_6 = 0.44497 \times 10^{-6}$, $A_8 = -0.23788 \times 10^{-9}$ Zoom data (variable space)

| | Wide angle position | Middle position | Telephoto position |
|---|---|---|---|
| $D_1$ | 9.5484 | 5.0864 | 1.2708 |
| $D_2$ | 3.3592 | 5.2739 | 8.2714 |

Fourth Embodiment

This embodiment shows the finder optical system where the number of lenses constituting the first lens unit in the ordinary photography is different from that in the panoramic photography. In FIG. 20A–20C, the finder optical system of the fourth embodiment comprises, in the ordinary photography, the objective system 1 including the first lens unit $G_1$ for fixation composed of a lens $G_{12}$ having a negative refracting power and a lens $G_{13}$ having a positive refracting power, the second lens unit $G_2$ moving in the optical path for making the magnification change, the third lens unit $G_3$ for making likewise the magnification change, and the fourth lens unit $G_4$ composed of a prism having two reflecting surfaces, and the eyepiece system 2 including the fifth lens unit $G_5$ composed of a prism having two reflecting surfaces and the sixth lens unit $G_6$ for fixation. In the panoramic photography, the first lens unit $G_1$ for fixation, as shown in FIG. 21A–21C, is replaced with the lens unit $G_1'$ having a negative refracting power.

According to the fourth embodiment, the first lens unit $G_1$ is constructed with two lenses of the lens $G_{12}$ having a negative refracting power and the lens $G_{13}$ having a positive refracting power, and its principal point is brought onto the object side. Consequently, the advantage is secured that the shift of the position where the lens unit is inserted in association with the lens replacement is diminished and the overall length of the objective system can be reduced.

Figure 23A:
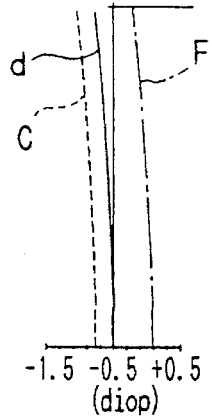
Figure 23B:
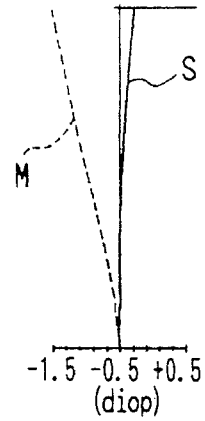
Figure 23C:
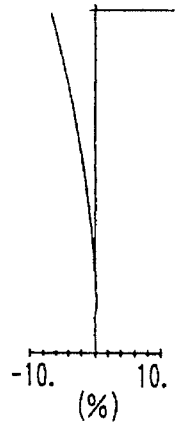
Figure 23D:
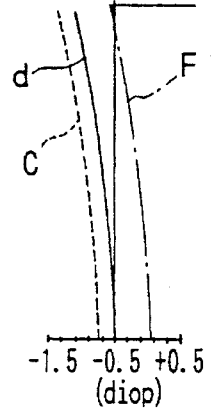
Figure 23E:
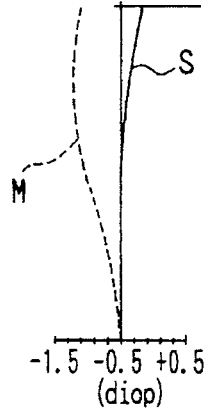
Figure 23F:
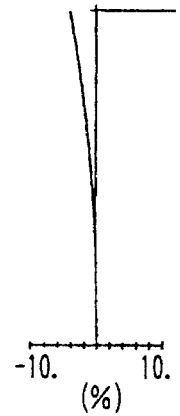
Figure 23G:
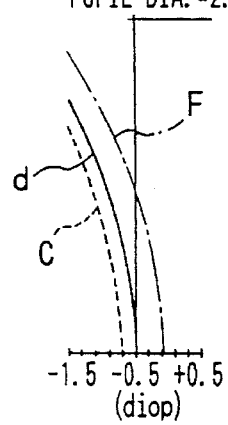
Figure 23H:
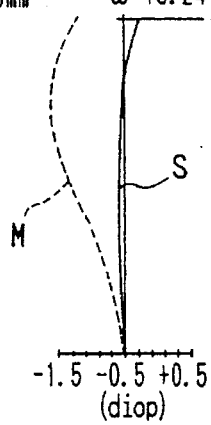
Figure 23I:
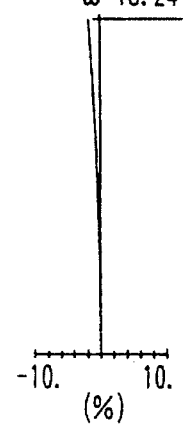

The numerical data of the optical systems shown in FIGS. 20A–20C and 21A–21C are given below. Their aberration curve diagrams are shown In FIGS. 22A–22I and 23A–23I.

Condition $| f/F - f'/F' | = 0.248$
Variable magnification ratio of the first lens unit
$f_B/f_A = 1.20$
<Ordinary photography>
Magnification 0.40–0.53–0.69
Incident angle (2ω) 51.7°–38.6°–29.2°

| | | | |
|---|---|---|---|
| $r_1 = -13.2049$ | $d_1 = 1.500$ | $n_1 = 1.58423$ | $v_1 = 30.49$ |
| $r_2 = 7.4474$ (aspherical) | $d_2 = 1.000$ | | |
| $r_3 = 12.9110$ (aspherical) | $d_3 = 3.000$ | $n_2 = 1.49241$ | $v_2 = 57.66$ |

-continued

| | | | |
|---|---|---|---|
| $r_4 = -51.6679$ | $d_4 = D_2$ (variable) | | |
| $r_5 = 6.3076$ (aspherical) | $d_5 = 3.038$ | $n_3 = 1.49241$ | $v_3 = 57.66$ |
| $r_6 = 8.2961$ (aspherical) | $d_6 = D_2$ (variable) | | |
| $r_7 = 20.8296$ | $d_7 = 2.376$ | $n_4 = 1.49241$ | $v_4 = 57.66$ |
| $r_8 = -15.9006$ (aspherical) | $d_8 = D_3$ (variable) | | |
| $r_9 = 15.1399$ | $d_9 = 21.000$ | $n_5 = 1.49241$ | $v_5 = 57.66$ |
| $r_{10} = \infty$ | $d_{10} = 1.000$ | | |
| $r_{11} = \infty$ | $d_{11} = 23.500$ | $n_6 = 1.49241$ | $v_6 = 57.66$ |
| $r_{12} = \infty$ | $d_{12} = 2.820$ | | |
| $r_{13} = 22.0057$ | $d_{13} = 3.200$ | $n_7 = 1.49241$ | $v_7 = 57.66$ |
| $r_{14} = -18.5419$ (aspherical) | $d_{14} = 20.000$ | | |
| $r_{15} = $ (eyepoint) | | | |

Aspherical coefficients

Second surface ($r_2$)

$P = 1.0000$, $A_4 = -0.17964 \times 10^{-2}$,
$A_6 = -0.17032 \times 10^{-4}$, $A_8 = 0.26913 \times 10^{-5}$
Third surface ($r_3$)

$P = 1.0000$, $A_4 = -0.10443 \times 10^{-2}$,
$A_6 = 0.13806 \times 10^{-4}$, $A_8 = 0.83061 \times 10^{-6}$
Fifth surface ($r_5$)

$P = 1.0000$, $A_4 = -0.51418 \times 10^{-3}$,
$A_6 = 0.30992 \times 10^{-7}$, $A_8 = -0.37232 \times 10^{-6}$
Eighth surface ($r_8$)

$P = 1.0000$, $A_4 = 0.13005 \times 10^{-3}$,
$A_6 = -0.62158 \times 10^{-6}$, $A_8 = -0.19779 \times 10^{-7}$
Fourteenth surface ($r_{14}$)

$P = 1.0000$, $A_4 = 0.74822 \times 10^{-4}$,
$A_6 = -0.50612 \times 10^{-6}$, $A_8 = 0.54551 \times 10^{-8}$ Zoom data (variable space)

| | Wide angle position | Middle position | Telephoto position |
|---|---|---|---|
| $D_1$ | 4.6855 | 1.8736 | 1.2065 |
| $D_2$ | 7.3994 | 5.2024 | 1.0000 |
| $D_3$ | 1.0000 | 6.0100 | 10.8795 |

\<Panoramic photography\>
Magnification 0.48~0.64~0.83
Incident angle (2ω) 46.3°~34.7°~26.5°

| | | | |
|---|---|---|---|
| $r_1 = -779.4136$ | $d_1 = 1.500$ | $n_1 = 1.58423$ | $v_1 = 30.49$ |
| $r_2 = 10.3355$ (aspherical) | $d_2 = D_1$ (variable) | | |
| $r_3 = 6.3076$ (aspherical) | $d_3 = 3.038$ | $n_2 = 1.49241$ | $v_2 = 57.66$ |
| $r_4 = 8.2961$ (aspherical) | $d_4 = D_2$ (variable) | | |
| $r_5 = 20.8296$ | $d_5 = 2.376$ | $n_3 = 1.49241$ | $v_3 = 57.66$ |
| $r_6 = -15.9006$ (aspherical) | $d_6 = D_3$ (variable) | | |
| $r_7 = 15.1399$ | $d_7 = 21.000$ | $n_4 = 1.49241$ | $v_4 = 57.66$ |
| $r_8 = \infty$ | $d_8 = 1.000$ | | |
| $r_9 = \infty$ | $d_9 = 23.500$ | $n_5 = 1.49241$ | $v_5 = 57.66$ |
| $r_{10} = \infty$ | $d_{10} = 2.820$ | | |
| $r_{11} = 22.0057$ | $d_{11} = 3.200$ | $n_6 = 1.49241$ | $v_6 = 57.66$ |
| $r_{12} = -18.5419$ (aspherical) | $d_{12} = 20.000$ | | |
| $r_{13} = $ (eyepoint) | | | |

Aspherical coefficients

Second surface ($r_2$)

$P = 1.0000$, $A_4 = 0.32742 \times 10^{-5}$,
$A_6 = 0.29354 \times 10^{-5}$, $A_8 = 0.16774 \times 10^{-6}$
Third surface ($r_3$)

$P = 1.0000$, $A_4 = -0.51418 \times 10^{-3}$,
$A_6 = 0.30992 \times 10^{-7}$, $A_8 = -0.37232 \times 10^{-6}$
Sixth surface ($r_6$)

$P = 1.0000$, $A_4 = -0.13005 \times 10^{-3}$,
$A_6 = -0.62158 \times 10^{-6}$, $A_8 = 0.19779 \times 10^{-7}$
Twelfth surface ($r_{12}$)

$P = 1.0000$, $A_4 = 0.74822 \times 10^{-4}$,
$A_6 = -0.50612 \times 10^{-6}$, $A_8 = 0.54551 \times 10^{-8}$ Zoom data (variable space)

| | Wide angle position | Middle position | Telephoto position |
|---|---|---|---|
| $D_1$ | 6.6724 | 3.8594 | 3.1924 |
| $D_2$ | 7.3994 | 5.2024 | 1.0000 |
| $D_3$ | 1.0000 | 6.0100 | 10.8795 |

Fifth Embodiment

This embodiment has the same principle as in the above embodiments, and instances the case where the first lens unit $G_1$ is replaced to thereby provide a lens switching zoom finder which is capable of changing magnification in a wide region from the wide angle side to the telephoto side. In FIGS. 24A–24C and 25A–25C, the finder optical system of the fifth embodiment includes the lens units similar to that of the first embodiment. Specifically, the second and third lens units $G_2$ and $G_3$ moving in the optical path are shifted from the wide angle position on the wide angle side. When they reach the telephoto position, the first lens unit $G_1$ having a negative refracting power is replaced with the first lens unit $G_1'$ having a positive refracting power, and at the same time, the second and third tens units $G_2$ and $G_3$ is returned to the wide angle position. Thus, zooming can be further performed on the telephoto side. In this case, when the finder magnifications before and after the replacement of the first lens unit $G_1$ are made equal, an ordinary zoom finder is obtained. Also, in a bifocal camera equipped with a trimming zoom mechanism which brings about pseudo-telephotography by trimming a film, it is not necessary to make the finder magnification before the replacement of the first lens unit $G_1$ equal to that after the replacement.

According to the fifth embodiment, the finder optical system has the advantages that the replacement of the first lens unit $G_1$ leads to quick zooming in a wide variable magnification region, and in the bifocal camera equipped with the trimming zoom mechanism, a bifocal finder suitable for practical cameras can be brought about.

The numerical data of the optical systems shown in FIGS. 24A–24C and 25A–25C are given below. Their aberration curve diagrams are shown in FIGS. 26A–26I and 27A–27I.

Condition | f/F − f'/F' | = 0.138
Variable magnification ratio of the first lens unit
$f_B/f_A = 1.50$
\<Ordinary photography\>
Magnification 0.42~0.57~0.77
Incident angle (2ω) 52.8°~44.0°~36.0°

| | | | |
|---|---|---|---|
| $r_1 = -4.8716$ (aspherical) | $d_1 = 1.482$ | $n_1 = 1.58423$ | $v_1 = 30.49$ |

-continued

| | | | |
|---|---|---|---|
| $r_2 = -13.8055$ (aspherical) | $d_2 = D_1$ (variable) | | |
| $r_3 = 3.7292$ (aspherical) | $d_3 = 3.895$ | $n_2 = 1.49241$ | $v_2 = 57.66$ |
| $r_4 = 4.2924$ | $d_4 = D_2$ (variable) | | |
| $r_5 = -56.0506$ (aspherical) | $d_5 = 2.000$ | $n_3 = 1.49241$ | $v_3 = 57.66$ |
| $r_6 = -10.6378$ (aspherical) | $d_6 = D_3$ (variable) | | |
| $r_7 = 10.1220$ (aspherical) | $d_7 = 16.000$ | $n_4 = 1.49241$ | $v_4 = 57.66$ |
| $r_8 = \infty$ | $d_8 = 1.000$ | | |
| $r_9 = \infty$ | $d_9 = 23.500$ | $n_5 = 1.49241$ | $v_5 = 57.66$ |
| $r_{10} = \infty$ | $d_{10} = 2.800$ | | |
| $r_{11} = 22.0089$ | $d_{11} = 3.207$ | $n_6 = 1.49241$ | $v_6 = 57.66$ |
| $r_{12} = -18.5397$ (aspherical) | $d_{12} = 20.000$ | | |
| $r_{13} =$ (eyepoint) | | | |

Aspherical coefficients

First surface ($r_1$)

$P = 1.0000$, $A_4 = 0.26482 \times 10^{-2}$,
$A_6 = -0.53431 \times 10^{-4}$, $A_8 = 0.34291 \times 10^{-5}$
Third surface ($r_3$)

$P = 1.0000$, $A_4 = -0.24031 \times 10^{-2}$,
$A_6 = 0.10767 \times 10^{-5}$, $A_8 = 0.68511 \times 10^{-7}$
Sixth surface ($r_6$)

$P = 1.0000$, $A_4 = -0.17742 \times 10^{-3}$,
$A_6 = 0.15002 \times 10^{-5}$, $A_8 = -0.29375 \times 10^{-6}$
Seventh surface ($r_7$)

$P = 1.0000$, $A_4 = -0.15378 \times 10^{-4}$,
$A_6 = 0.55839 \times 10^{-5}$, $A_8 = -0.77656 \times 10^{-7}$
Twelfth surface ($r_{12}$)

$P = 1.0000$, $A_4 = -0.74822 \times 10^{-4}$,
$A_6 = -0.50612 \times 10^{-6}$, $A_8 = 0.54551 \times 10^{-8}$ Zoom data (variable space)

| | Wide angle position | Middle position | Telephoto position |
|---|---|---|---|
| $D_1$ | 9.3994 | 7.2094 | 5.7056 |
| $D_2$ | 6.2230 | 4.0406 | 1.0000 |
| $D_3$ | 1.0000 | 5.3726 | 9.9169 |

<Telephoto side>
Magnification 0.60~0.69~0.90
Incident angle (2ω) 33.1°~28.2°~23.4°

| | | | |
|---|---|---|---|
| $r_1 = 15.1950$ (aspherical) | $d_1 = 1.500$ | $n_1 = 1.58423$ | $v_1 = 30.49$ |
| $r_2 = 6.4693$ (aspherical) | $d_2 = D_1$ (variable) | | |
| $r_3 = 3.7292$ (aspherical) | $d_3 = 3.895$ | $n_2 = 1.49241$ | $v_2 = 57.66$ |
| $r_4 = 4.2924$ | $d_4 = D_2$ (variable) | | |
| $r_5 = -56.0506$ | $d_5 = 2.000$ | $n_3 = 1.49241$ | $v_3 = 57.66$ |
| $r_6 = -10.6378$ (aspherical) | $d_6 = D_3$ (variable) | | |
| $r_7 = 10.1220$ (aspherical) | $d_7 = 16.000$ | $n_4 = 1.49241$ | $v_4 = 57.66$ |
| $r_8 = \infty$ | $d_8 = 1.000$ | | |
| $r_9 = \infty$ | $d_9 = 23.500$ | $n_5 = 1.49241$ | $v_5 = 57.66$ |
| $r_{10} = \infty$ | $d_{10} = 2.800$ | | |
| $r_{11} = 22.0089$ | $d_{11} = 3.207$ | $n_6 = 1.49241$ | $v_6 = 57.66$ |
| $r_{12} = -18.5397$ (aspherical) | $d_{12} = 20.000$ | | |
| $r_{13} =$ (eyepoint) | | | |

Aspherical coefficients

Second surface ($r_2$)

$P = 1.0000$, $A_4 = -0.17060 \times 10^{-2}$,
$A_6 = -0.53431 \times 10^{-4}$, $A_8 = 0.34291 \times 10^{-5}$
Third surface ($r_3$)

$P = 1.0000$, $A_4 = -0.24031 \times 10^{-2}$,
$A_6 = 0.10767 \times 10^{-3}$, $A_8 = -0.12634 \times 10^{-4}$
Sixth surface ($r_6$)

$P = 1.0000$, $A_4 = -0.17742 \times 10^{-3}$,
$A_6 = 0.15002 \times 10^{-5}$, $A_8 = 0.29375 \times 10^{-6}$
Seventh surface ($r_7$)

$P = 1.0000$, $A_4 = -0.15378 \times 10^{-4}$,
$A_6 = 0.55839 \times 10^{-5}$, $A_8 = -0.77656 \times 10^{-7}$
Twelfth surface ($r_{12}$)

$P = 1.0000$, $A_4 = -0.74822 \times 10^{-4}$,
$A_6 = -0.50612 \times 10^{-6}$, $A_8 = 0.54551 \times 10^{-8}$ Zoom data (variable space)

| | Wide angle position | Middle position | Telephoto position |
|---|---|---|---|
| $D_1$ | 4.9040 | 2.7140 | 1.2102 |
| $D_2$ | 6.2230 | 4.0406 | 1.0000 |
| $D_3$ | 1.0000 | 5.3726 | 9.9169 |

In the above embodiments, $r_1, r_2, \ldots$ represent radii of curvature of individual lens surfaces; $d_1, d_2, \ldots$ thicknesses of individual lenses or spaces therebetween; $n_1, n_2, \ldots$ refractive indices of individual lenses; and $v_1, v_2, \ldots$ Abbe's numbers of individual lenses.

Also, the configurations of aspherical surfaces in the embodiments are expressed by the following equation using the aspherical coefficients:

$$Z = CY^2/(1 + \sqrt{1 - PC^2Y^2}) + A_4Y^4 + A_6Y^6 + A_8Y^8$$

where Z represents the coordinates in the direction of the optical axis, Y the coordinates in the direction normal to the optical axis, R the paraxial radius of curvature (C= 1/R), P the conic constant, and $A_4$, $A_6$, and $A_8$ the aspherical coefficients of second, fourth, sixth, and eighth orders, respectively.

What is claimed is:

1. A real image mode variable magnification finder optical system forming a finder optical path independent of a photographic optical path formed by a photographic objective lens, comprising:

an objective system having a positive refracting power as a whole; and an eyepiece system having a positive refracting power as a whole, for observing an image of an object formed by said objective system, wherein said objective system comprises a first lens unit which is a front optical unit having at least one lens, a second lens unit which is an alternative front optical unit having a refracting power different from that of said first lens unit, said first and second lens units being alternatively insertable into the finder optical path, an intermediate lens unit disposed after one of said first and second lens units, whichever is inserted into the finder optical path, said intermediate lens unit having at least one lens unit movable along the finder optical path for performing a zooming operation irrespective of which of said first and second units is disposed in said finder optical path, and a rear optical unit disposed after said intermediate lens unit and having a plurality of reflecting surfaces.

2. A finder optical system according to claim 1, wherein said first lens unit has at least one negative lens and is movable along the finder optical path as a whole.

3. A finder optical system according to claim 1, wherein said first lens unit has a negative refracting power as a whole.

4. A finder optical system according to claim 1, wherein said intermediate lens unit includes a third lens unit movable along the finder optical path and said rear optical unit includes a fourth lens unit having one of a positive refracting power and a negative refracting power.

5. A finder optical system according to claim 1, wherein said intermediate lens unit includes a third lens unit movable along the finder optical path and a fourth lens unit movable along the finder optical path for changing a distance between said third lens unit and said fourth lens unit, and said rear optical system includes a fifth lens unit having a positive refracting power as a whole.

6. A finder optical system according to claim 1, wherein said intermediate lens unit includes a third lens unit movable along the finder optical path and a fourth lens unit movable along the finder optical path for changing a distance between said third lens unit and said fourth lens unit, and said rear optical unit includes a fifth lens unit having a negative refracting power as a whole.

7. A finder optical system according to any one of claims 4, 5 or 6, wherein said third lens unit has a positive refracting power as a whole.

8. A finder optical system according to any one of claims 1, 4, 5 or 6, wherein said first and second lens units satisfy a condition:

$$|f/F - f'/F'| < 0.50$$

where f is a focal length of said first lens unit, f' is a focal length of said second lens unit, and F and F' are distance from first surfaces of said first lens unit and said second lens unit to focal positions thereof.

9. A real image mode variable magnification finder optical system according to claim 1,
wherein said intermediate lens unit consists essentially of a single lens and said zooming operation is performed by changing distances between one of said first lens unit and said second lens unit inserted in the finder optical path, said intermediate lens unit, and said rear optical unit.

10. A real image mode variable magnification finder optical system according to claim 1,
wherein said intermediate lens unit includes a plurality of lenses.

11. The finder optical system according to any one of claims 1, 9 or 10, wherein said rear optical unit has one of a positive power and a negative power as a whole.

\* \* \* \* \*